US006541100B1

(12) United States Patent
Williams et al.

(10) Patent No.: US 6,541,100 B1
(45) Date of Patent: *Apr. 1, 2003

(54) IMAGED MEDIUM COMPRISING SENSOR-READABLE INDICIA

(75) Inventors: Kevin W. Williams, Rochester, NY (US); Huijuan D. Chen, Webster, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 29 days.

(21) Appl. No.: 09/223,859

(22) Filed: Dec. 31, 1998

(51) Int. Cl.⁷ .................................................. B32B 3/00
(52) U.S. Cl. ........................ 428/195; 383/93; 383/113
(58) Field of Search ............................ 428/195; 283/93, 283/109, 91, 86, 113

(56) References Cited

U.S. PATENT DOCUMENTS

| | | |
|---|---|---|
| 3,926,633 A | 12/1975 | Custer |
| 4,075,018 A | 2/1978 | Custer |
| 4,180,204 A | 12/1979 | Koenig et al. |
| 4,308,327 A | 12/1981 | Bird et al. |
| 4,869,532 A | 9/1989 | Abe et al. |
| 4,983,817 A | 1/1991 | Dolash et al. |
| 5,030,544 A | 7/1991 | Olbrechts et al. |
| 5,093,147 A | 3/1992 | Andrus et al. |
| 5,225,900 A | 7/1993 | Wright |
| 5,314,336 A | 5/1994 | Diamond et al. |
| 5,401,561 A | 3/1995 | Fisun et al. |
| 5,423,432 A | 6/1995 | Krutak et al. |
| 5,502,304 A | 3/1996 | Berson et al. |
| 5,516,590 A | 5/1996 | Olmstead et al. |
| 5,541,633 A | 7/1996 | Winnik et al. |
| 5,554,842 A | 9/1996 | Connell |
| 5,629,512 A | 5/1997 | Haga |
| 5,644,447 A | 7/1997 | Takayama et al. |
| 5,644,557 A | 7/1997 | Akamine et al. |
| 5,684,069 A | 11/1997 | Auslander |
| 5,693,693 A | 12/1997 | Auslander et al. |
| 6,102,505 A * | 6/2000 | McIntyre et al. ............... 347/2 |
| 6,094,279 A * | 7/2000 | Soscia ........................ 358/1.9 |
| 6,191,406 B1 * | 2/2001 | Nelson et al. ........... 250/208.1 |

FOREIGN PATENT DOCUMENTS

| | | |
|---|---|---|
| EP | 0 411 602 A2 | 2/1991 |
| EP | 0 420 613 A2 | 4/1991 |
| EP | 0 663 429 A1 | 7/1995 |
| EP | 0 681 012 A1 | 11/1995 |

OTHER PUBLICATIONS

Shinji Ohyama et al., Optical Sheet Memory System, Electronics & Communications in Japan, Part II, Apr. 1, 1992, vol. 75, No. 4, pp. 73–84.

* cited by examiner

*Primary Examiner*—Bruce H. Hess
*Assistant Examiner*—Michael E Grendzynski

(57) ABSTRACT

This invention provides a method of storing encoded data on an article comprising applying said data on a surface of the article, as an encodement invisible to the human eye under normal viewing conditions. The invention also provides materials for use in said method.

This invention comprises an article having on a surface thereof data represented by a material applied to the article that forms a differential light pattern when illuminated which is capable of being read by a sensor capable of detecting said differential light pattern, said material being substantially invisible to the human eye under normal viewing conditions;

wherein the light absorbance of at least a portion of the surface of the article underlying said data is different from the absorbance of the material comprising the data under the conditions in which the data is read.

16 Claims, No Drawings

IMAGED MEDIUM COMPRISING SENSOR-READABLE INDICIA

FIELD OF THE INVENTION

This invention relates to an article having encoded data on a surface thereof and a method for storing data by applying encoded data onto a surface of an article.

BACKGROUND OF THE INVENTION

Applying visually observable, digitally readable data on an article is known. For example linear bar-codes are printed on many articles today for identification and inventory control. The information in such bar-codes can be easily retrieved by a scanner and interpreted by a computer. A disadvantage of these types of bar-codes is that they are visible to the naked eye and interfere with viewing of other information which may be on the article beneath the bar-code. Alternatively the bar-code may be printed in an area which contains no additional underlying information however this option limits the amount of information that can be encoded in the bar-code and can prevent digital reading and translating the encoded data during normal observation of the article. Restriction of the encoded data to small areas also defines the of amount of encoded data. Therefore the prior art generally refers to storage of very small information bits, such as a stock item number or a postal zip code.

UV absorbing materials are known to be useful for invisible markings. Examples are disclosed in patents U.S. Pat. No. 5,502,304, U.S. Pat. No. 5,401,561, U.S. Pat. No. 5,554,842, U.S. Pat. No. 5,629,512 and U.S. Pat. No. 5,693,693 where UV light is used to illuminate marks on documents such as mail pieces so that the marks can then be read in the red or green portion of the electromagnetic spectrum. UV fluorescent labels (U.S. Pat. No. 5,401,561) have been disclosed for security marking of basic commodity or collector's article. The marks described in these patents are either small pictures, several numerical figures or linear bar-codes. Printing of magnetic data strips is also known for encodement of data onto articles. The magnetic strips have been applied to the backsides of films for the storage of data. Magnetic data has disadvantages as well. First data stored in this method has to be retrieved with a magnetic head employing relative motion between the head and magnetic strip for signal reproduction. Critical alignment between the read head and the data track, as well as maintaining intimate contact between the read head and magnetic strip are important considerations that make magnetic strip reproduction unattractive option for data reproduction.

Also magnetic recording media has limited life in terms of wear-out and inherent loss of the magnetically recorded data over time. Moreover magnetic materials are not invisible. The data capacity is limited by the need to find available blank space on an article to use these materials to avoid impacting the normal viewing of the article.

There also exists much prior art which involves motion picture sound tracks. Several patents describe UV fluorescent materials such as toners in U.S. Pat. No. 4,308,327, UV fluorescent layers (U.S. Pat. No. 3,926,633) or IR absorbing dyes (U.S. Pat. No. 5,030,544).

Many materials have been disclosed for formulation into invisible inks and used to mark various articles with invisible marks. None of the prior art teaches or enables how to place a data code directly on the surface of an article containing existing information on the surface thereof, such as a photographic or printed image, without impairing that information and still allow for interpretation and retrieval of the data with an appropriate sensor. This invention relates not only to the discovery of specific materials for achieving this goal but more to those conditions which allow invisible marking, preferentially a two-dimensional data pattern, such as a two-dimensional bar code or a dot code, to be applied to an article where such article has underlying information, such as a color photographic or printed image. This is Especially true when the data is large and the pattern containing the data needs to take up large portions of the surface area and avoidance of covering at least a portion of the image region is not possible. Obviously it is detrimental to viewing the image if it is obscured or damaged in any way by the presence of a visible pattern of data overlying the image. One solution to this problem is disclosed in U.S. Pat. No. 5,644,447. In the system described in the '447 patent a black two dimensional barcode is printed on the back side of the image, on a blank portion of the image surface area or on a whitened out region of a image print, what is described in their patent art as an optical modulation layer, which further obscures the underlying image. Our invention avoids these limitations and permits application of data directly over the image (or other information) without obscuring or damaging the underlying image (or other information).

PROBLEM TO BE SOLVED BY THE INVENTION

There exists a need to use invisible materials to apply, especially large, data files on article, in specific conditions which overcome the problems and limitations of the prior art.

A basic problem that has to be overcome to achieve the dual goal of invisibility and then readable, is that the many of the materials referred to as "invisible inks" are only invisible when applied at very low levels. In other words the sensitivity of a sensor device has to be better than the human eye at these low levels. If the material absorbs light in the visible region (400–700 nm), this burden is the largest to overcome. Even when a material has an absorption maximum in the UV and IR regions frequently there is still have some absorption in the visible region. Because of this basic problem we have found that many of the materials disclosed for this use in the prior art are barely detectable by an appropriate sensor on white backgrounds at the levels where they are no longer visible. When the additional burden of an underlying colored image is added, most of those materials are no longer detectable by the sensor. The problem of detectability is greatest when an underlying colored image dye absorbs light even slightly where the overlying data material absorbs. The detection by a sensor relies on a material, upon illumination by an appropriate illuminant, to cause an attenuation of light relative to the background. The material of the data can absorb the light and emit it (for example fluoresce) at a different wavelength than the background reflection wavelength or the material can absorb the light and convert it to a non-irradiative energy (for example heat). Regardless of the mechanism, in conditions where the materials would be invisible these attenuations tend to be small. When applied over colored image dye these small signals are generally overwhelmed by large light absorption of the image dyes. Therefore the attenuation of the data carrying material is itself attenuated by the light characteristics of the underlying image often rendering them undetectable.

SUMMARY OF THE INVENTION

However we have discovered special conditions under which this problem can be overcome.

In accordance with one aspect of the invention, there is provided a method of storing encoded data on an article comprising applying said data on a surface of the article, as an encodement invisible to the human eye under normal viewing conditions. In preferred embodiments of the invention, the data is encoded as a two dimensional bar code.

In accordance with another aspect of the invention, there is provided the materials for storing data on an article such that these materials are invisible to the naked eye and do not interfere with the normal observation of the article under normal viewing conditions.

Yet another aspect of the invention provides for the selection of data carrying materials whose absorption and emission properties are substantially different from that of the underlying materials. Another aspect of the invention is a condition such data carrying material must have a minimal amount of absorption in visible region at a level which is detectable by a sensor at a wavelength which enables the previous aspect. Yet another aspect of the invention is when the amount of data needed to be stored requires the use of a sufficiently large area of the article where at least partially superposition of the overlying data pattern and the underlying image can't be avoided.

A further aspect of the invention comprises an article having on a surface thereof data represented by a material applied to the surface that forms a differential light pattern when illuminated with an appropriate light source which data is capable of being read by a sensor capable of detecting said differential light pattern, said material being substantially invisible to the human eye under normal viewing conditions;

wherein the light absorbance of at least a portion of the surface of the article underlying said data is different from the absorbance of the material comprising the data under the conditions in which the data is read.

Yet another aspect of this invention comprises a method of storing data which comprises applying to a surface of an article a material that forms a differential light pattern when illuminated which is capable of being read by a sensor capable of detecting said differential light pattern, said material being substantially invisible to the human eye under normal viewing conditions;

wherein the light absorbance of at least a portion of the surface of the article underlying said data is different from the absorbance of the material comprising the data under the conditions in which the data is read.

In accordance with this invention a digital sensor detects the difference in light intensity of a substance relative to a background. In other words the contrast in light caused by a material. The term "differential light pattern" refers to the contrast pattern which is readable by a sensor after illumination of the material applied to the surface on an article in the form of this pattern.

Advantageous Effect of the Invention

In accordance with this invention it is possible to mark an article with an invisible material in a fashion where large data files can be stored on the surface of said article when the article may have existing underlying information, images or other marks.

DETAILED DESCRIPTION OF THE INVENTION

This invention is directed to those conditions which allow and enable the use of materials which when applied to a surface of an article are: 1) invisible to the naked human eye under normal viewing conditions, 2) partially or entirely over the image area of an underlying image, 3) capable of carrying large data files, 4) readable by an appropriate sensor device.

The following conditions we have found to be useful for the practice of this invention. A data carrying material should have a light absorption or emission maximum at a substantially a different wavelength maximum than that of an underlying colorant on an article. Any data carrying material is useful if the spectral overlap between such material and any underlying information, such as an image is minimized. The overall objective of any data carrying material is to provide the maximum amount of signal with the minimal amount of perceived visibility. Therefore a second requirement of the data carrying material is to have a minimal absorption visible region, i.e., from 400–700 nm.

The article can be any article on which one wants to apply encoded data. Such articles, include, for example, paper, including plain paper, glossy inkjet paper, thermal transfer receiver paper, conventional photographic paper, or transparent sheets, book cover, display windows or even on walls. The invention is particularly advantageous for encodement of invisible data on the surface of an article which contains visual information, such as a photographic or other printed image, underlying the invisible data. This enables an observer to view the underlying information at the same time as the encoded data is read by an appropriate digital reader, as discussed more fully below. In preferred embodiments of the invention the article is a still article, that is, the article does not need to be moved relative the device used to read the encoded data.

Unlike linear bar codes of the prior art, the encoded data described herein is 2-dimensional and generally comprises larger data blocks than can be stored as a linear bar code. This large data field often requires use of the entire surface area.

The amount of encoded data stored on the surface of the article in accordance with this invention depends on the size of the surface. For example if the surface of the article is 8" by 10–, the encoded data can be as large as 312,000 pixels whereas an article having a 4" by 5" surface can store up to 80,250 pixels of data. In general the data stored is at least 500 pixels per square inch, preferably at least about 1000 pixels per square inch and most preferably at least about 1500 pixels per square inch. In general the data stored is between about 500 and 5000 pixels per square inch, preferably between about 1000 and 5000 pixels per square inch and most preferably about 1500 and 5000 pixels per square inch.

The material used for the encoded data should absorb little, if any, light in the visible region of the electromagnetic spectrum (i.e. in the range of about 400 nm to about 700nm).

In preferred embodiments of the invention the material absorbs or emits in the infrared (IR) region of the spectrum, in particular the light absorbs light between 800 nm and 1200 nm. Preferable the material absorbs light above about 850 nm.

In certain embodiments of the invention, the material absorbs or emits in the ultraviolet (UV) portion of the spectrum, i.e., wavelengths below about 400 nm.

In certain embodiments of the invention, the invisible material is a luminescent material. A luminescent material is defined as any material which absorbs light and then emits light at another region of the electromagnetic spectrum which may be detected by some sensor device. While most luminescent materials absorb light at a particular wavelength and emit light at longer wavelength the materials of this invention are not limited to such restrictions. In fact materials where the opposite is true would also be useful for the purpose of this invention and such materials will be herein referred to a up-converters or up-conversion materials (for a review of system upconverters see *Indian J. Of Pure and Appl. Phys.*, 33, 169–178, (1995). The invisible, luminescent materials can be either dyes, pigment, or any other material possessing the desired absorption properties. And the fluorescent dyes can absorb either in the UV, visible or in the infrared region of the electromagnetic spectrum at a concentration such that the data can be detected by a sensor and the data does not interfere with viewing the underlying information or image.

The term "invisible materials" is used herein to describe materials that absorb little, in any light in the visible region of the spectrum, but absorb in the IR or UV regions. In the event the material absorbs some light in the visible region, the material should be used at relatively low concentration so that the material can be detected by the sensor yet will not interfere with viewing any underlying information or image.

The following materials are useful in the practice of this invention

Material 1 contains a list of typical UV or visible absorbing materials which upon illumination with an appropriate light source, fluoresce in the visible or near IR region of the electromagnetic spectrum.

Material 1

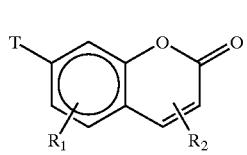

A

-continued

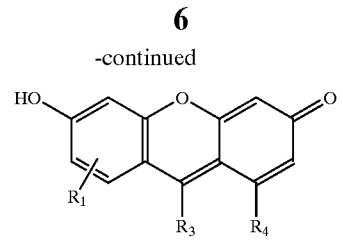

B

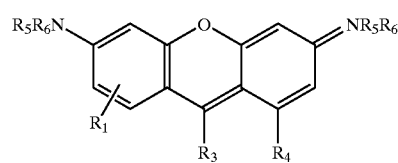

C

Compounds A, B, C are general representations of coumarins, fluoresceins and rhodamines respectively. Dyes of the classes disclosed above have been reviewed for there use in biological applications (*Appl. Phys.* B56, 385–390 (1993). These molecules are highly luminescent and maybe useful for the present invention. R1 represents any group including a hydrogen, substituted alkyl (per-halogenated, branched, saturated or unsaturated), halogen atoms (Cl, Br, I), any aryl group (phenyl, naphthyl, pyrrlyl, thienyl, furyl, etc.) or acyl (amido, ester, or carboxy), any sulfonic acid groups or derivatives of sulfonic acids (sulfonamides, sulfuryl halides, nitro, or substituted ether group. In general R1 could be any group that allows these compounds to remain luminescent. T represents any of the following groups, OH, substituted or unsubstituted amino, a substituted amino group where the amino is a member of any ring, fused or otherwise. R2 can be any substituted alkyl, aryl or acyl groups (perfluoronated alkyl groups are particularly useful in this position). R3 can be hydrogen, or substituted alkyl. When R3 is aryl or CN these dyes are particularly useful for the present invention, these dyes absorb in the IR region of the electromagnetic spectrum. R4 can be any substituted alkyl, aryl or acyl groups (perfluoronated alkyl groups are particularly useful in this position). R5 and R6 can be hydrogen atoms or any combination of alkyl groups. R5 and R6 can represent groups necessary to form any ring (e.g. pyrrole, pyrimidine, morpholine or thiomorpholine). R5 and R6 may be part of a bicyclic ring system, fused onto the phenyl ring as shown in the general structure below.

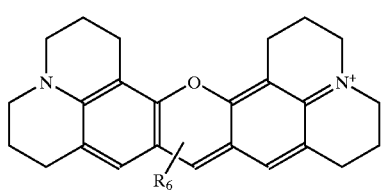

D

A reference describing the use of fused molecules of this type have been reviewed (*Tetrahedron*, Vol. 34, No.38, 6013–6016, (1993)). Additionally the impact of annulation on absorption and fluorescence characteristics of related materials is has also been described (*J. Chem. Soc., Perkin Trans.* 2, 853–856, (1996)).

Material 2

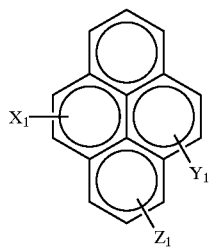

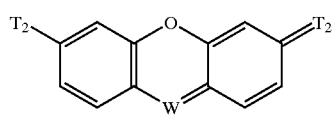

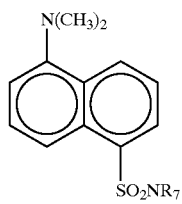

Aromatics (polycyclic aromatics especially) such as shown in Material 2 are useful for this invention. X1, Y1, Z1 can be any groups which allow these compounds to be luminescent. In F, T2 represents any substituted or unsubstituted amino or substituted or unsubstituted oxygen and W can be carbon, or nitrogen. These compounds are particularly useful when X1, Y1 or Z1 are donor and acceptor groups on the same molecule as depicted on the so called "dansyl" molecule depicted as compound G. Anthracenes, pyrenes and their benzo derivatives are examples of fused aromatics. These materials are can be used individually or in combination with multiple components to form complexes which are luminescent. Sulfonated polyaromatics are particularly useful in water-based ink formulations. Lucifer yellow (H) dyes are often soluble in water and are comparatively stable and have hence been useful as biological stains (*Nature*, 292, 17–21, (1981)).

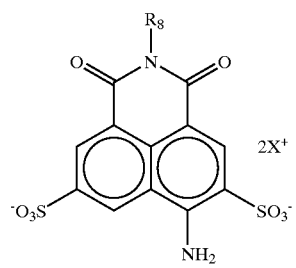

The commercial Lucifer yellow dyes were H where R8 is any alkyl and $X^+$ represents a cation, necessary to balance the negative charge is useful for this invention The merits of this type of molecule and its luminescent properties have been disclosed (U.S. Pat. No. 4,891,351) for use in thermal transfer applications.

Material 3

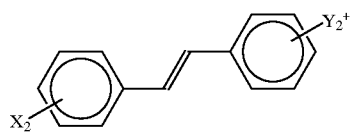

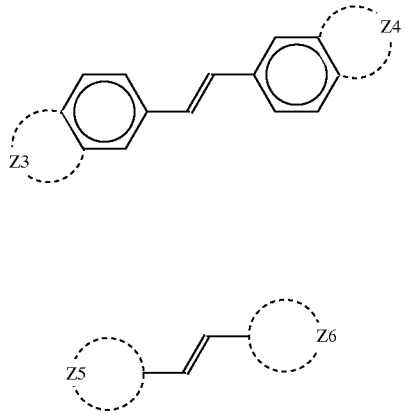

The stilbene class of dyes (Material 3) are useful for the present invention. These dyes are very commonly used commercially as optical brightners for paper stock (see Colourage 47–52, (1995) for an excellent review of fluorescent stilbene type lumiphores). For this invention X2 and/or Y2 can be any substituent or group that promotes absorption of this chromophore in the UV or short wavelength visible and subsequently emits light in the visible. Examples include but are not limited to halogens (Cl, I, etc.), alkyl (methyl, ethyl, butyl, iso-amyl, etc.) which may be used to increase organic solubility, sulfonic acid and its derivatives which may be useful for increasing water solubility, carboxylic acid groups which be used for solubility but also as a position of oligomerization or polymerization. Also useful are amine derive substituents, which can be used to append groups for solubility purposes and polymerization but additionally may be used to manipulate the absorption characteristics. Stilbenes where X2 and Y2 are comprised of groups which allow for a donor and acceptor molecule in the same molecule are particularly useful for this purpose. In structures J and K, Z3, Z4, Z5 and Z6 represent any atoms that can be used to form a ring of any size or substitution with the proviso that the material is still luminescent. For structure K, it is noteworthy that Z5 and Z6 represent heteroaromatic nuclei, such as benzoxazolium, benzothiazolium, benzimdazolium, or their naphthalene derivatives, which make these compounds highly fluorescent.

Material 4

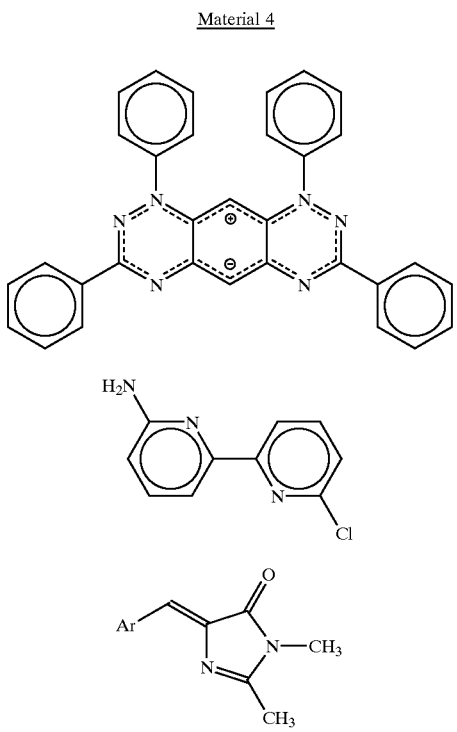

Highly fluorescent amine heterocycles have recently been described in the academic literature and would be particularly useful for this invention. Material 4 contains several of the more recent discovered compounds described in the academic literature. The novel and highly fluorescent (($\phi$~0.33) tetraphenylhexaazaanthracene (TPHA, L) is atmosphere stable and thermally stable up to 400° C. (see *J. Am. Chem. Soc.* 120, 2989–2990, (1998)and included references). Such properties would be extremely useful for encodement of data where archival stability expects to be an important issue. The diaminobipyridine compound M, was found to be highly fluorescent ($\phi$~0.8)and have a substantial Stokes' shift ($\Delta\lambda_{em-abs}$~100 nm), which are optical properties, that qualify these chromophores as preferred for this invention (for a literature ref. described (*J. Chem. Soc., Perkin Trans.* 2, 613–617, (1996)). The benzimidazalones N are also highly fluorescent ($\phi$~0.8) when incorporated into certain environments (see *Tetrahedron Letters*, 39, 5239–5242, (1998) for a recent article describing the synthesis of similar compounds). The aromatic group (Ar) can be a simple phenyl or more intricate heteroaromatic groups (imidazolo, benzoxazolo, indole, etc.). Material 5 contains another general class of useful dyes for the application described in the present invention.

Material 5

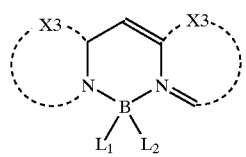

-continued

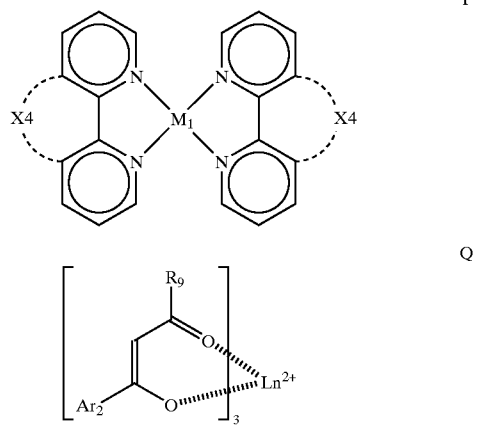

Compounds O, P, and Q represent several classes of metallized dyes which are included in the scope of the present invention. Boron complexes such as compound (O) are very fluorescent, stable and easily synthesized from commercially available materials (a reference describing the merits of fluorescent boron complexes for biological usage see *J. Am. Chem. Soc.* 116, 7801–7803, (1994). X3 represents atoms necessary to form an aromatic or heteroaromatic ring, L1 and/or L2 could be halogens, ether or any other ligand which commonly has an affinity for boron metal. Bipyridyl metal complexes such as (P) are described in the academic literature as being luminescent (for a review of the general use of luminescent materials in sensors see *Chem. Rev.*, 97, 1515–1566, (1997)). Due to the described optical properties is highly conceivable that such complexes would be useful for the present invention. X3 could be an atom which form either an aromatic fused ring forming a phenanthroline complex or saturated ring which could restrict from rotation the bipyridyl functions. M1 represents any metal that would provide a luminescent complex (e.g. Ru or Re)or a metal which when complexed with the bipyridyl ligand quenches luminescence in a photographic manner. Compound (Q) represents the lanthanide complexes which have been described by others to be useful for thermal transfer imaging (U.S. Pat. No. 5,006,503). Lanthanide metal complex dyes have UV absorbance and typically large Stokes' shifts.

Material 6

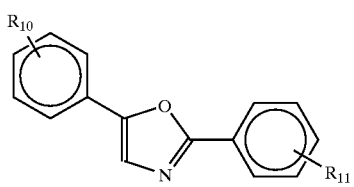

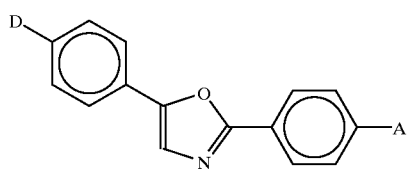

Dyes such as the phenyloxozolium compounds, generally depicted as in Material 6, are very fluorescent and have the added feature that the fluorescent signal is long lived (see *Photochemistry and Photobiology*, 66 (4), 424–431, (1997)). When the R-groups represent donor (D) and acceptor (A)groups on the same molecule as depicted in structure S, then these materials possess superior luminescent properties. In fact the high fluorescence quantum yields ($\phi_F$~0.91) are obtained in certain solvent environments (see previous reference for an example).

The materials discussed in the previous examples absorbed light in either the UV or visible region of the electromagnetic spectrum. These materials have several advantages for use in the application described in the present invention. Often the materials are atmospherically stable, they are commercially available since they have been used extensively in non-photographic applications and finally good optical properties can been had (e.g. large Stokes' shifts, high fluorescence quantum yield ($\phi_F$, long excited state lifetimes τ. etc.). The materials in the next serious of examples absorb light in the IR and for the most part emit further into the IR. Since these materials emit beyond the absorption of the other possible colorants on articles, IR luminescent materials can be detected easier from background colorants. The next several materials are typical IR materials useful for this invention.

Material 8

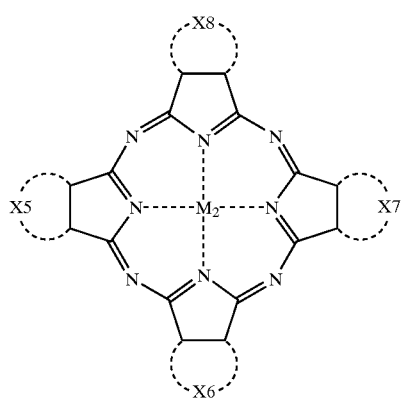

Material 8 contains a general structure depicting a phthalocyanine or naphthalocyanine compound. Phthalocyanines are well known in the photographic industry(for a historic reference for these compounds and their basic luminescence properties see *Molecular Luminescence: An International Conference.*, New York, W. A. Benjamin, 295–307, (1969)). They have been used in electroconductive applications, as absorber dyes for photothermographic printing and as colorants in inks (for a general reference see chapters 5 and 9 in *Infared Absorbing dyes: Topics in Applied Chemistry.*, Edited by Masaru Matsuoka, New York, Plenum Press, 1990. Several well known properties of the phthalocyanines and their extended analogs, naphthalocyanines, have high fluorescence efficiencies (see *Dyes and Pigments*, 11, 77–80, (1989)) for certain types and superior thermal (see *Aust. J. Chem.*, 27, 7–19, (1974))and light stability (for a recent disclosure see *Dyes and Pigments*, 35, 261–267, (1997). These properties make these materials ideal for storage of large data amounts for extended periods as described in this invention. Compound T depicts a general structure of a phthalocyanine or naphthalocyanine. X5, X6, X7 and X8 represent atoms necessary to form a ring. The ring is often aromatic or heteroaromatic such as phenyl, 1,2-fused naphthyl, 1,8-fused naphthyl or larger fused polyaromatics such as fluoroanthrocyanine. The rings may be substituted in any way in the spirit of this invention provided that the materials is still luminescent. In fact differential substitution can be used to attenuate the physical properties (e.g. light stability and solubility) or enhance the optical properties of a material (e.g. Fluorescence efficiency or Stokes' shift). The rings may contain functional groups through which oligomerization can be accomplished. The (X5–8)-groups may be the same or different leading to symmetrical or unsymmetrical materials respectively. The metal atom (M2)can be any metal with the proviso that it allows for luminescent materials. The metal(M2) can also represent two hydrogen atoms, these materials are usually referred to as "non-metallized" (na)phthalocyanines. Some metals can possess additional "axial" ligands (e.g. Al and Si)which are useful for appending additional functional groups to alter the properties of the dyes. Additionally these groups prevent chromophore aggregation which may perturb the luminescent properties of the chromophores. These ligands also useful points of attachment for oligerimerize these materials (see *Thin Solid Films*, 299,63–66, (1997)) or to create dendrimers (see *Angew. Chem. Int. Ed.* 37 (8), (1092–1094), (1998). A related class of materials is depicted in material 9. Compound U is classified as a "sub"-phthalocyanine (see for a lead article on the synthesis and properties of these materials *J. Am. Chem. Soc.* 118, 2746–2747, (1996)). As for the phthalocyanines these materials are very fluorescent ($\phi$~0.80). In fact these materials are useful in preparing unsymmetrical phthalocyanines. The sub-naphthalocyanines with the proper substitution can absorb in the near IR and have Stokes' shift comparable if not larger than the analogous naphthalocyanines.

Material 9

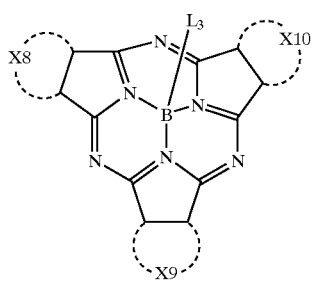

U

The group L2, like similar "axial substituents on phthalocyanines these groups may be useful for modifying the properties of the materials. Also like phthalocyanines these groups are expected to prevent chromophore aggregation which may perturb the luminescent properties of the chromophores.

Material 10

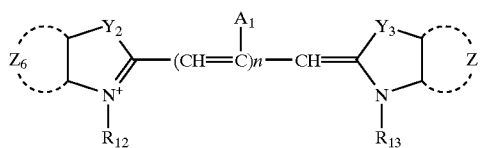

V

Cyanines such as depicted in structure V are luminescent and useful for this invention. In the above structure n could be 0 or any integer (e.g. 1–4) and A is a group that is appended to the central chain carbon or atom. The group A, can be any alkyl, aromatic or heteroaromatic group. A can be any group with the proviso that the dye is still luminescent. Y2 and Y3 could be independently one of the following groups: N, O, S, Se, or Te, additional C(alkyl)2 which forms the indole nucleus, well recognized by anyone skilled in the art as an indole ring. Additionally when Y2 or Y3 is nitrogen then it is substituted with an appropriate group, forming what is recognizable as an imidazolium ring by any skilled in the art. Z6 and Z7 represent atoms necessary for forming a saturated aromatic or unsaturated non-aromatic ring. The ring so formed could be phenyl, naphthyl or any other fused aromatic. Likewise the ring could be any aromatic or non-aromatic heteroatom containing ring (e. g. pyridyl, quinoyl, etc.) R12 or R13 represent any of the possible nitrogen substituents well known by any skilled in the art. For example R12 or R13 may be independently saturated substituted or unsubstituted alkyl (e.g. methyl, ethyl, heptafluorobutyl, etc.)or non-saturated alkyl (vinyl, allelic, acetylinic). R12 and R13 may also be charged groups (cationic, anionic or both). In cases where the R12 and or R13 are charged and a net charge exists on the dye, it is obvious to anyone skilled in the art, that there exist a combination of counterions to balance the charge. For example if R12 and R13 are both sulfoalkyl the net charge on the chromophore may be −1 and hence would be charge balanced with an appropriate cation (e. g. Na+, K+, triethylammonium, etc.) Likewise if R12 and R13 are simple uncharged alkyl groups such methyl, then the dye may have a net +1 charge and hence have to be charge balanced with a negative anion (e. g. perfluorobutyrate, I-, BF4-, etc.). R12 and R13 could be groups necessary to incorporate the material in an oligomer or polymer. The dye may be incorporated into the polymer backbone or be pendant. Additionally the polymer may incorporate this material by non-covalent forces (charge-charge interactions, encapsulation, etc.). Long chain cyanines are often bridged. It is known that such bridging Material 11

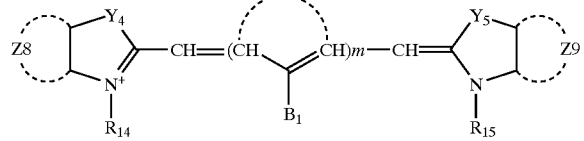

W has a stabilizing effect on cyanine dyes and stability is a preferred embodiment here such dyes are preferred. The bridge could be any saturated structure of any size, preferably 5, 6, 7 membered. Such ring may be functionalized with the usual groups alkyl (e.g. methyl, t-butyl) carboxlic acid (and its derivatives), sulfonic acids (and its derivatives) halogen, aromatic and heteroaromatic. Group B could be the usual chain substituents, halogen (preferable Cl), phenyl, heteroaryl (e. g. furyl, thienyl, etc.), ethereal (e. g. ethoxy, phenoxy, benzyloxy), or barbiturate, mercapto (e. g. thiophenoxy, thiobenzyloxy, etc.), amino (e. g. anilino, etc.). B1 could represent a point of attachment for oligomerization or polymerization. It is noted that m represents an integer from 1–3 as dyes containing such bridging are well known in the art. Z groups represent atoms necessary to for fused rings. Each Z group represents any ring which allows these dyes to be luminescent. Y4 and Y5 represent atoms necessary to form the typical dye nuclei and could anything which allows the material to be luminescent. Material 12 illustrates another useful feature. That is X1 and X2 represent the atoms necessary to for a ring from the nitrogen atom of the hetero-nucleus to the chromophore chain. Typically forming a 5-member or six member ring. Ridigization of chromophores as depicted in materials 11 and 12 is known to enhance the luminescence.

Material 12

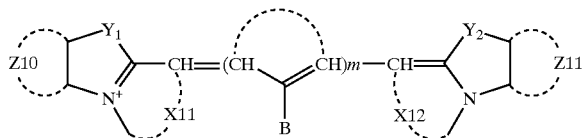

X

Another well known class of luminescent materials is depicted in material 13. This class of materials are known as squaraine dyes or squarylium dyes. The use of organic solubilized squaraines for antihalation protection in IR sensitive AgX applications has been described (WO 96/35142). These dyes have been also been disclosed for use as IR absorbing elements in laser addressable imaging elements (EP 0764877A1).

Material 13

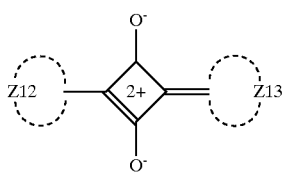

Squaraine dyes are well known to have good thermal stability, another preferred feature for any material of this invention. Z123 and Z13 independently represent any substituted aromatic or heteroaromatic nucleus. Typical aromatic nuclei include phenyl, naphthyl, pyrrylium, thiopyrrylium, or any other group which provides that the material is luminescent or absorbs a wavelength in the IR or UV region of the spectrum. Heteroaromatic rings could be but not limited to benzoxazolium, benthiazolium, quinoline or any other group which provided that the material is luminescent. It is also noteworthy to mention that the center ring does not have to feature the negative charge oxygen (O—). In fact squaraines where the central chain atom is either carbon (U.S. Pat. No. 5,227,499) and nitrogen (U.S. Pat. No. 5,227,498) have been disclosed.

Another class of IR materials are illustrated in material 14 (for a reference describing the merits of using squaraine and croconium dyes in optical recording materials see *Sensors and Actuators B*, 38–39, 202–206 (1997) and *Sensors and Actuators B*, 38–39, 252–255 (1997). The croconium dyes like squaraines are well known to have good thermal stability, another preferred feature for any material of this invention. Z12 and Z13 indenpently represent any substituted aromatic or heteroaromatic nucleus. Typical aromatic nuclei include phenyl, naphthyl, any other group which provided that the material is luminescent. pyrrylium, thiopyrrylium. Heteoaromatic includes but not limited to benzoxazolium, benthiazolium, quinoline or any other group which provided that the material is luminescent.

Material 14

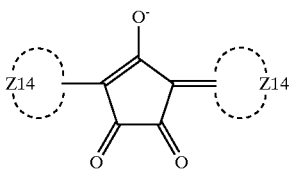

wherein Z14 represents any substituted aromatic or heteroaromatic nucleus.

The materials described hence forth have intrinsic luminescent properties. However materials are not intrinsically luminescent but become so after an activation step can be used in the practice of this invention. The art is plentiful of examples of materials which fit this description. Materials 15, 16, and 17 represent three of the more common materials. Other materials exist and respective methods for generating them are known. Generally these materials are considered useful for this invention if a luminescent material is the result of an activation step. Some of the most common activating steps include the use of light (the materials are referred to as "photochromic"), a chemical (usually some oxidant to oxidize a "leuco" dye),heat (e. g. thermographic), a reaction with another agent (e. g. a coupler with a photographic developer)or by non-covalent interaction between two or more agents often referred to as "host-guest or molecular recognition (e.g. metal complexation, chromophore-chromophore interactions, coupler-developer reaction. etc.).

Material 15

Equation 1

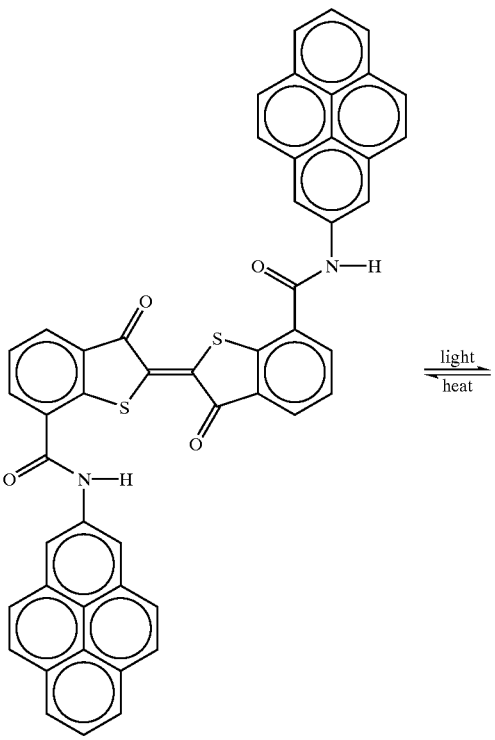

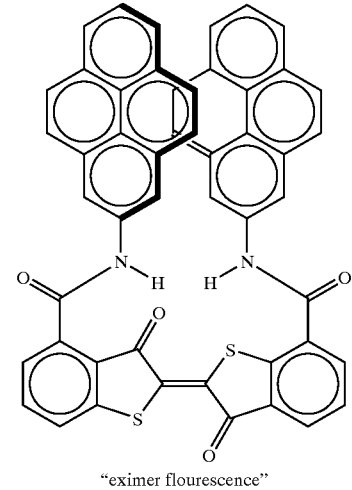

"eximer flourescence"

Equation 1 depicts the photo-conversion of a material into a material with additional "eximer fluorescence" (*J. Chem. Soc. Chem. Commun.*, 591 (1992)). The process uses light to generate a new material which could be easily a luminescent material. In the above example a second point relevant to this patent is illustrated, that is, that a second stimulus (heat in the above example) may be used to reverse a material from a colored (or luminescent) state to a colorless (or non-luminescent) state. It is in the spirit of the invention that the encodement may not necessarily be due to the luminescent material directly but may be due to its removal from a luminescent background.

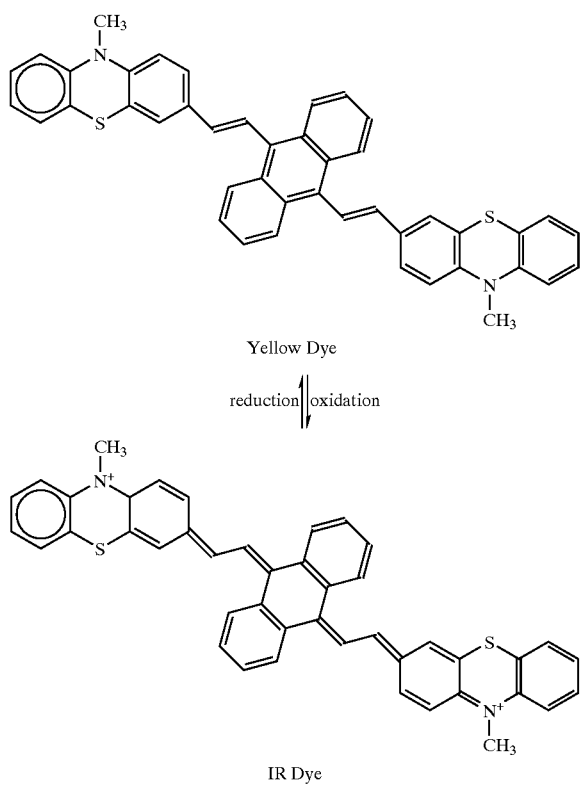

Equation 2

Yellow Dye reduction ⇅ oxidation

IR Dye

Equation 2 shows another type of activation of a material (*Angew. Chem. Int. Ed. Engl.*, 36 (24),2817–2819, (1997)). A material (or its luminescence) may be "turned on" or "off" with redox chemistry. The oxidation may come about by simple post-coating reaction with a molecular oxidant or a more complicated photographic process (generation of an oxidized color developer). Equation 2 also illustrates the possibility of a reversible system.

Equation 3 illustrates yet another possible way of generating a luminescent compound. This process involves the selective complexation ("molecular recognition" or "host-guest") of one non-luminescent component (dye-ligand) by another ($Cu^{2+}$ ion) to in this case convert the material to a luminescent material(*Angew. Chem. Int. Ed.* 37,772–773, (1998)). This example shows the formation of a new material without the possibility for reversal. However it is well known that molecular recognition can be used to form a transient luminescent species that can be reverted back to the non-luminescent material (see the following recent reference in the literature *J. Mater. Chem.*, 8 (6), 1379–1384, (1998)). For completion it is also acknowledged that a luminescent material could be converted to a non-luminescent material to for the encodement. The mechanisms by which these materials luminesce or do not luminesce and their physical attributes have been thoroughly reviewed (*Chem. Rev.*, 97, 1515–1564, (1997)). The materials and methods for generating luminescence described within this reference are useful in the practice of this invention. This invention however pertains to the use of these materials for encodement of data, in particular large data blocks, on articles.

Equation 3

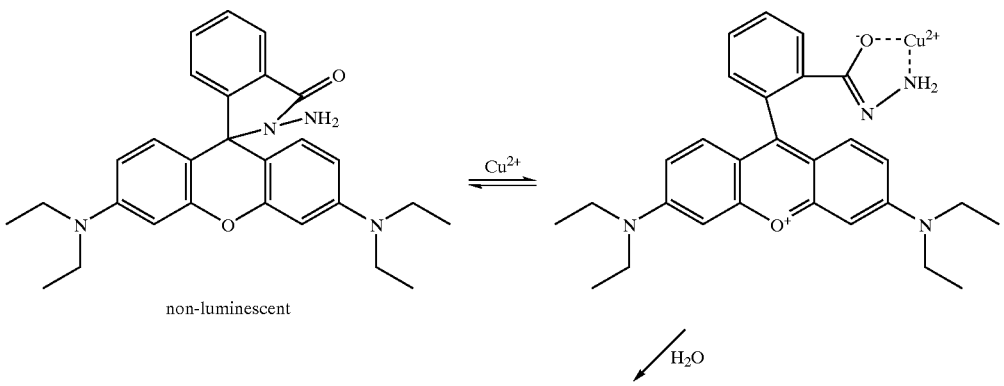

non-luminescent

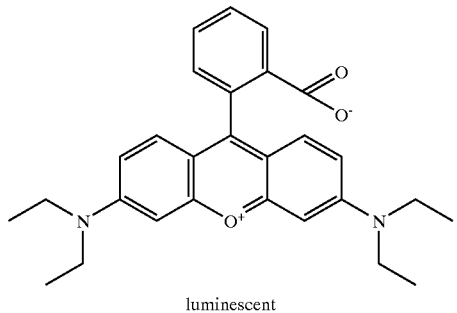

luminescent 15

Specific materials that can be used in this invention include:

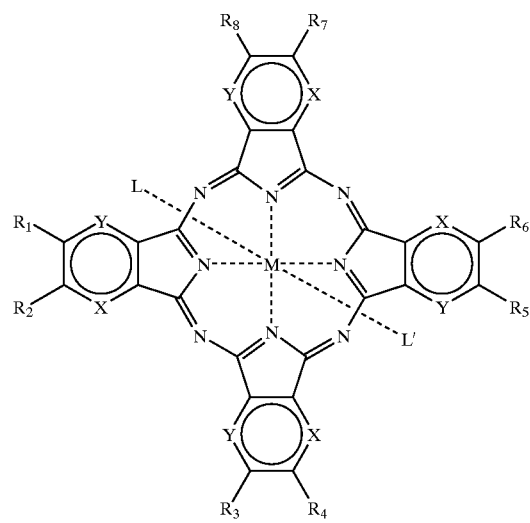

| Compound | R1 | R2 | R3 | R4 | R5 | R6 | R7 | R8 | X | Y | M | L | L' |
|---|---|---|---|---|---|---|---|---|---|---|---|---|---|
| I-1 | H | H | H | H | H | H | H | H | CH | CH | Al | Cl | — |
| I-2 | H | H | H | H | H | H | H | H | CH | CH | Al | OR$^a$ | — |
| I-3 | H | H | H | H | H | H | H | H | CH | CH | H2 | — | — |
| I-4 | H | H | H | H | H | H | H | H | CH | CH | Si | Cl | Cl |
| I-5 | H | H | H | H | H | H | H | H | CH | CH | Si | OH | OH |
| I-6 | H | H | H | H | H | H | H | H | CH | CH | Si | OR$^a$ | OR$^a$ |
| I-7 | H | H | H | H | H | H | H | H | CH | CH | Mg | — | — |
| I-8 | H | H | H | H | H | H | H | H | CH | CH | Zn | — | — |
| I-9 | H | H | H | H | H | H | H | H | CH | CH | Mn | — | — |
| I-10 | H | H | H | H | H | H | H | H | CH | CH | Eu | — | — |
| I-11 | H | H | H | H | H | H | H | H | CH | CH | Yb | — | — |
| I-12 | H | H | H | H | H | H | H | H | CH | CH | Sn | — | — |
| I-13 | H | H | H | H | H | H | H | H | NH | CH | Al | Cl | — |
| I-14 | H | H | H | H | H | H | H | H | NH | CH | Al | OR$^a$ | — |
| I-15 | H | H | H | H | H | H | H | H | NH | CH | H2 | — | — |
| I-16 | H | H | H | H | H | H | H | H | NH | CH | Si | Cl | Cl |
| I-17 | H | H | H | H | H | H | H | H | NH | CH | Si | OH | OH |
| I-18 | H | H | H | H | H | H | H | H | NH | CH | Si | OR$^a$ | OR$^a$ |
| I-19 | H | H | H | H | H | H | H | H | NH | CH | Mg | — | — |
| I-20 | H | H | H | H | H | H | H | H | NH | CH | Zn | — | — |
| I-21 | H | H | H | H | H | H | H | H | NH | CH | Mn | — | — |
| I-22 | H | H | H | H | H | H | H | H | NH | CH | Sn | — | — |

-continued

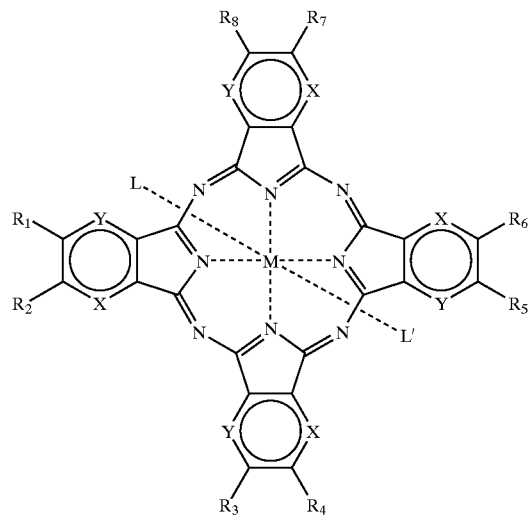

| Compound | R1 | R2 | R3 | R4 | R5 | R6 | R7 | R8 | X | Y | M | L | L' |
|---|---|---|---|---|---|---|---|---|---|---|---|---|---|
| I-23 | H | H | H | H | H | H | H | H | NH | CH | Eu | — | — |
| I-24 | H | H | H | H | H | H | H | H | CH | CH | Yb | — | — |
| I-25 | $SO_3^-$ | H | $SO_3^-$ | H | $SO_3^-$ | H | $SO_3^-$ | H | CH | CH | Al | Cl | — |
| I-26 | $SO_3^-$ | H | $SO_3^-$ | H | $SO_3^-$ | H | $SO_3^-$ | H | CH | CH | Al | OR$^a$ | — |
| I-27 | $SO_3^-$ | H | $SO_3^-$ | H | $SO_3^-$ | H | $SO_3^-$ | H | CH | CH | H2 | — | — |
| I-28 | $SO_3^-$ | H | $SO_3^-$ | H | $SO_3^-$ | H | $SO_3^-$ | H | CH | CH | Si | Cl | Cl |
| I-29 | $SO_3^-$ | H | $SO_3^-$ | H | $SO_3^-$ | H | $SO_3^-$ | H | CH | CH | Si | OH | OH |
| I-30 | $SO_3^-$ | H | $SO_3^-$ | H | $SO_3^-$ | H | $SO_3^-$ | H | CH | CH | Si | OR$^a$ | OR$^a$ |
| I-31 | $SO_3^-$ | H | $SO_3^-$ | H | $SO_3^-$ | H | $SO_3^-$ | H | CH | CH | Mg | — | — |
| I-32 | $SO_3^-$ | H | $SO_3^-$ | H | $SO_3^-$ | H | $SO_3^-$ | H | CH | CH | Zn | — | — |
| I-33 | $SO_3^-$ | H | $SO_3^-$ | H | $SO_3^-$ | H | $SO_3^-$ | H | CH | CH | Mn | — | — |
| I-34 | $SO_3^-$ | H | $SO_3^-$ | H | $SO_3^-$ | H | $SO_3^-$ | H | CH | CH | Eu | — | — |
| I-35 | $SO_3^-$ | H | $SO_3^-$ | H | $SO_3^-$ | H | $SO_3^-$ | H | CH | CH | Sn | — | — |
| I-36 | $SO_3^-$ | H | $SO_3^-$ | H | $SO_3^-$ | H | $SO_3^-$ | H | CH | CH | Yb | — | — |
| I-37 | t-butyl | H | t-butyl | H | t-butyl | H | t-butyl | H | CH | CH | Al | Cl | — |
| I-38 | t-butyl | H | t-butyl | H | t-butyl | H | t-butyl | H | CH | CH | H2 | — | — |
| I-39 | t-butyl | H | t-butyl | H | t-butyl | H | t-butyl | H | CH | CH | Al | OR$^a$ | — |
| I-40 | t-butyl | H | t-butyl | H | t-butyl | H | t-butyl | H | CH | CH | Si | Cl | Cl |
| I-41 | t-butyl | H | t-butyl | H | t-butyl | H | t-butyl | H | CH | CH | Si | OH | OH |
| I-42 | t-butyl | H | t-butyl | H | t-butyl | H | t-butyl | H | CH | CH | Si | OR$^a$ | OR$^a$ |
| I-43 | t-butyl | H | t-butyl | H | t-butyl | H | t-butyl | H | CH | CH | Mg | — | — |
| I-44 | t-butyl | H | t-butyl | H | t-butyl | H | t-butyl | H | CH | CH | Zn | — | — |
| I-45 | t-butyl | H | t-butyl | H | t-butyl | H | t-butyl | H | CH | CH | Mn | — | — |
| I-46 | t-butyl | H | t-butyl | H | t-butyl | H | t-butyl | H | CH | CH | Yb | — | — |
| I-47 | t-butyl | H | t-butyl | H | t-butyl | H | t-butyl | H | CH | CH | Sn | — | — |
| I-48 | t-butyl | H | t-butyl | H | t-butyl | H | t-butyl | H | CH | CH | Eu | — | — |
| I-49 | t-butyl | H | t-butyl | H | t-butyl | H | t-butyl | H | N(Me)2 | CH | Al | Cl | Cl |
| I-50 | t-butyl | H | t-butyl | H | t-butyl | H | t-butyl | H | N(Me)2 | CH | Al | OH | OH |
| I-51 | t-butyl | H | t-butyl | H | t-butyl | H | t-butyl | H | N(Me)2 | CH | Al | OR$^a$ | OR$^a$ |
| I-52 | t-butyl | H | t-butyl | H | t-butyl | H | t-butyl | H | N(Me)2 | CH | Si | Cl | Cl |
| I-53 | t-butyl | H | t-butyl | H | t-butyl | H | t-butyl | H | N(Me)2 | CH | Si | OH | OH |
| I-54 | t-butyl | H | t-butyl | H | t-butyl | H | t-butyl | H | N(Me)2 | CH | Si | OR$^a$ | OR$^a$ |
| I-55 | t-butyl | H | t-butyl | H | t-butyl | H | t-butyl | H | N(Me)2 | CH | Mg | — | — |
| I-56 | t-butyl | H | t-butyl | H | t-butyl | H | t-butyl | H | N(Me)2 | CH | Zn | — | — |
| I-57 | t-butyl | H | t-butyl | H | t-butyl | H | t-butyl | H | N(Me)2 | CH | Mn | — | — |
| I-58 | t-butyl | H | t-butyl | H | t-butyl | H | t-butyl | H | N(Me)2 | CH | Eu | — | — |
| I-59 | t-butyl | H | t-butyl | H | t-butyl | H | t-butyl | H | N(Me)2 | CH | Sn | — | — |
| I-60 | t-butyl | H | t-butyl | H | t-butyl | H | t-butyl | H | N(Me)2 | CH | Yb | — | — |

$^a$R could be any substituted alkyl (methyl, ethyl, n-butyl, t-butyl, isoamyl etc . . . ), any substituted silyl group (e.g. trimethylsilane, tributylsilane, trichlorosilane, triethoxysilane, etc . . . ) or any group that could be used to make the above compounds oligomeric or prevent dye aggregation)

I-61

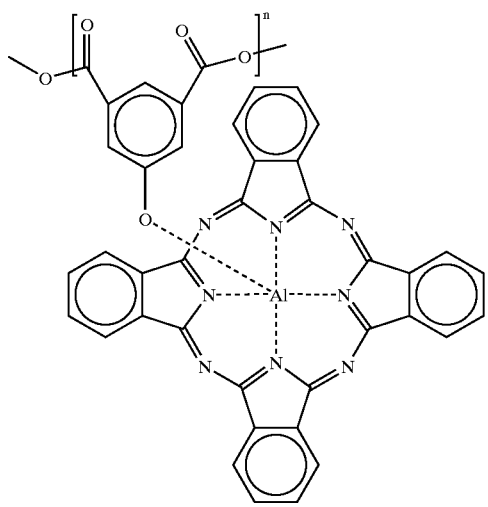

wherein n = any interger and the linkage depicts formation of any polyester

I-62 wherein n = any interger and the linkage depicts formation of any polyester

| Compound | R1 | R2 | R3 | R4 | X[a] | Y[a] | M | L | L' |
|---|---|---|---|---|---|---|---|---|---|
| II-1 | H | H | H | H | CH | CH | Al | Cl | — |
| II-2 | H | H | H | H | CH | CH | H2 | — | — |
| II-3 | H | H | H | H | CH | CH | Al | OR[a] | OR[a] |
| II-4 | H | H | H | H | CH | CH | Si | Cl | Cl |
| II-5 | H | H | H | H | CH | CH | Si | OH | OH |
| II-6 | H | H | H | H | CH | CH | Si | OR[a] | OR[a] |
| II-7 | H | H | H | H | CH | CH | Mg | — | — |
| II-8 | H | H | H | H | CH | CH | Zn | — | — |
| II-9 | H | H | H | H | CH | CH | Mn | — | — |
| II-10 | H | H | H | H | CH | CH | Eu | — | — |
| II-11 | H | H | H | H | CH | CH | Sn | — | — |
| II-12 | H | H | H | H | CH | CH | Yb | — | — |
| II-1 | H | H | H | H | COR | COR | Al | Cl | — |
| II-2 | H | H | H | H | COR | COR | H2 | — | — |
| II-3 | H | H | H | H | COR | COR | Al | OR[a] | OR[a] |
| II-4 | H | H | H | H | COR | COR | Si | Cl | Cl |
| II-5 | H | H | H | H | COR | COR | Si | OH | OH |
| II-6 | H | H | H | H | COR | COR | Si | OR[a] | OR[a] |
| II-7 | H | H | H | H | COR | COR | Mg | — | — |
| II-8 | H | H | H | H | COR | COR | Zn | — | — |
| II-9 | H | H | H | H | COR | COR | Mn | — | — |
| II-10 | H | H | H | H | COR | COR | Eu | — | — |
| II-11 | H | H | H | H | COR | COR | Sn | — | — |
| II-12 | H | H | H | H | COR | COR | Yb | — | — |

[a]R could be any substituted alkyl (methyl, ethyl, n-butyl, t-butyl, isoamyl etc any substituted silyl group (e.g. trimethylsilane, tributylsilane, trichlorosilane triethoxysilane, etc . . . ) or any group that could be used to make the above compounds oligomeric or prevent dye aggregation).

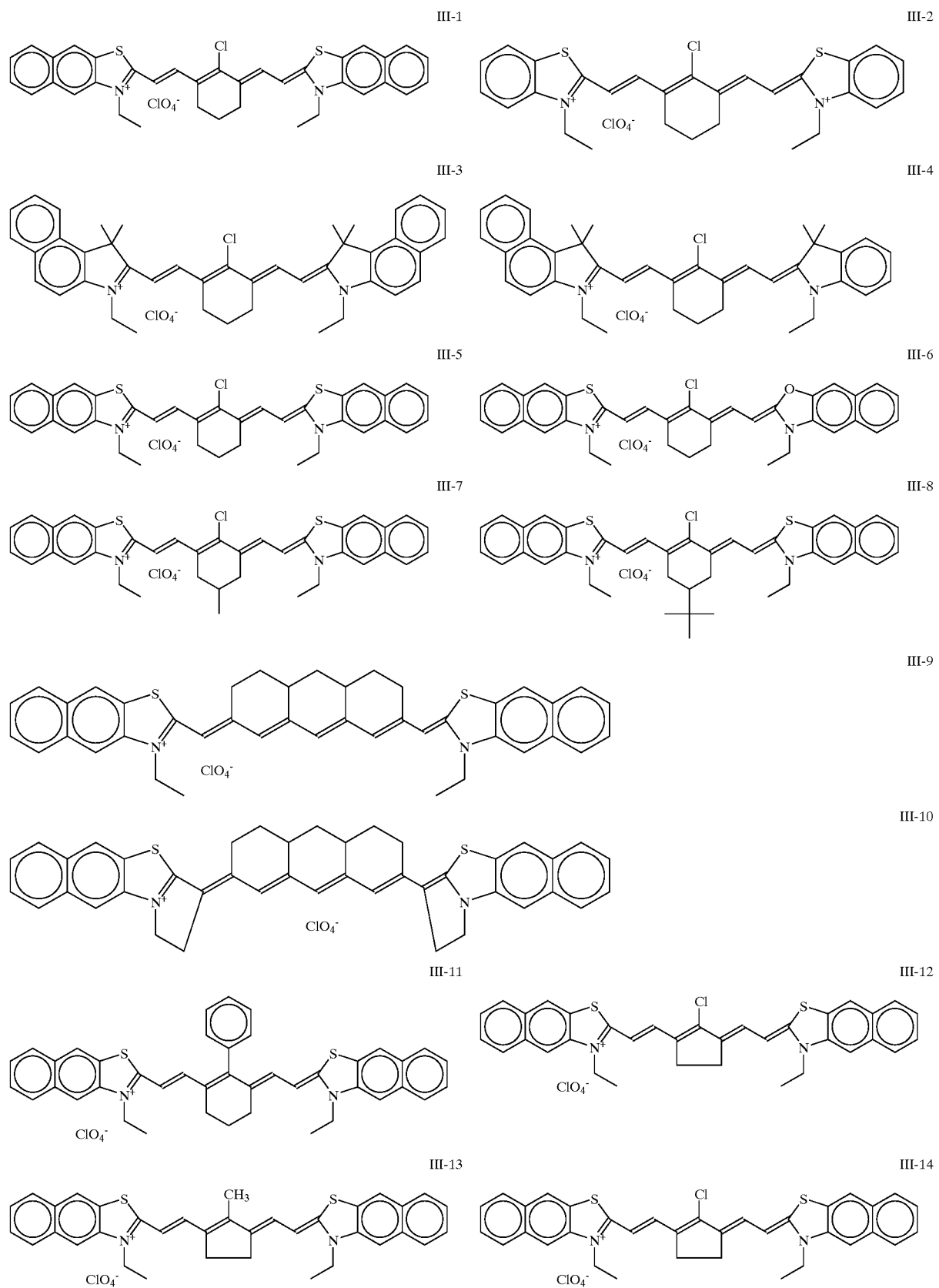

-continued
III-15
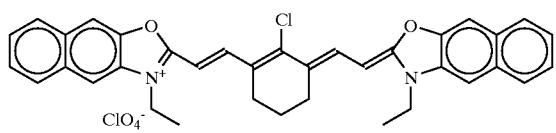
III-16
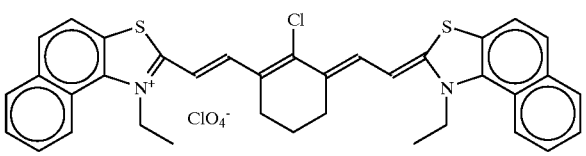
III-17
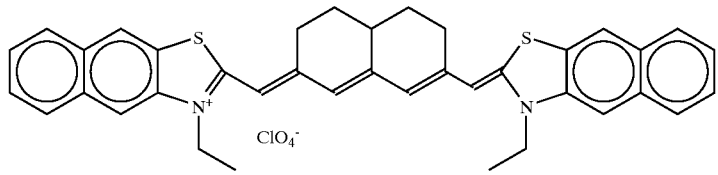
III-18
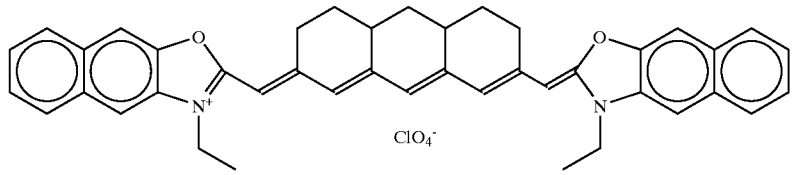
III-19
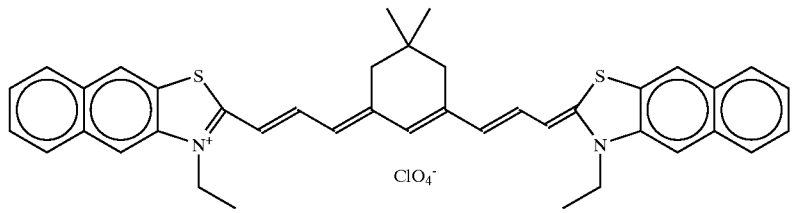
III-20
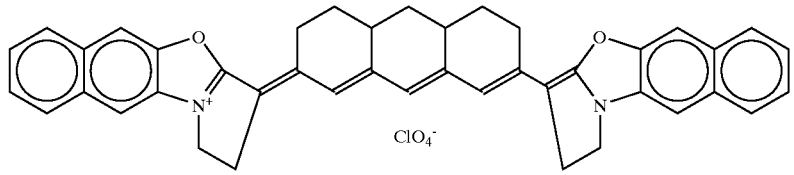
III-21
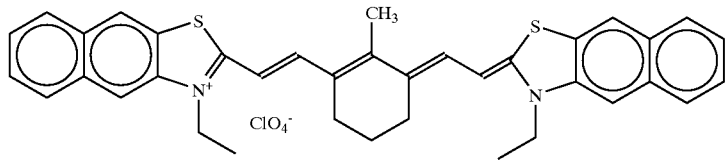
III-22
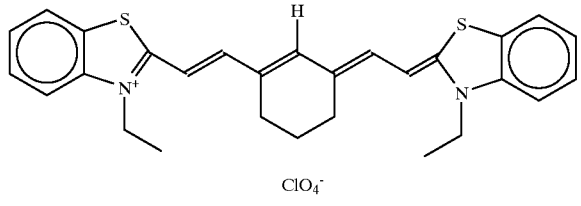
III-23
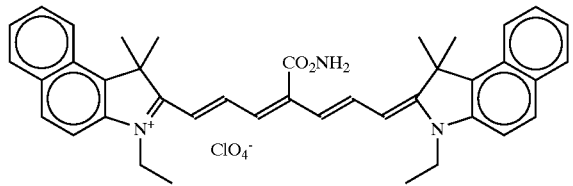
III-24
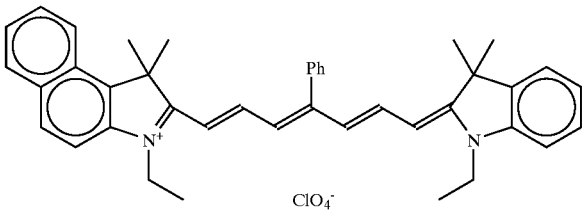

-continued
III-25
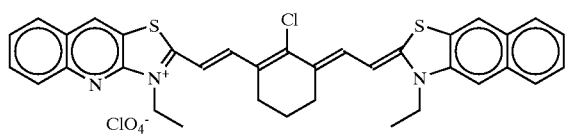
III-26
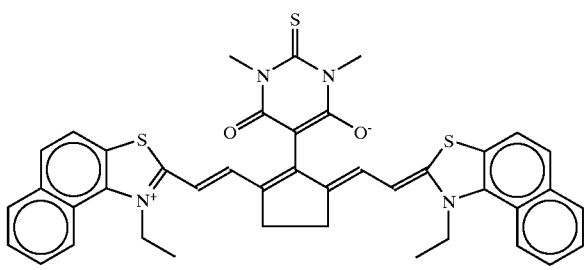
III-27
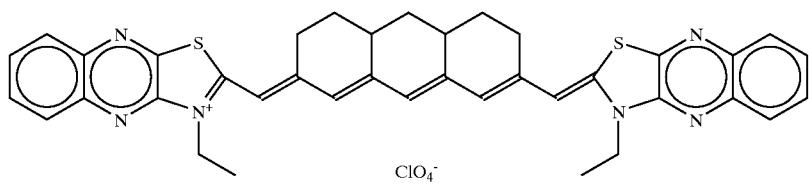
III-28
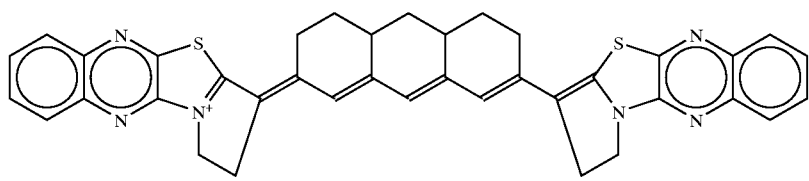
III-29
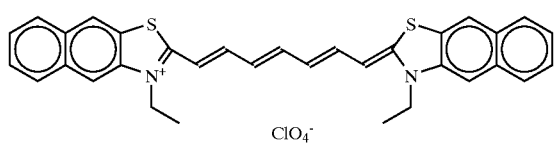
III-30
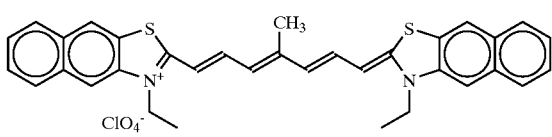
III-31
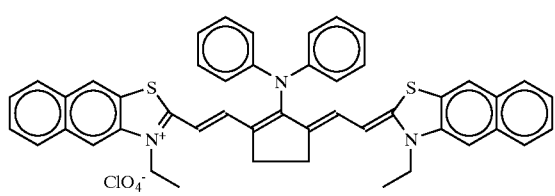
III-32
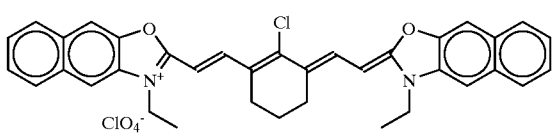
III-33
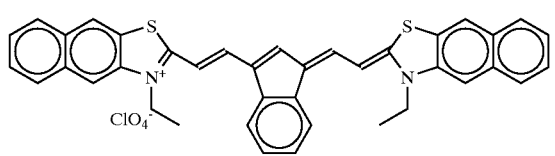
III-34
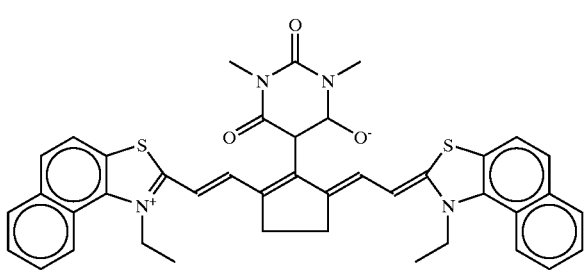
III-35
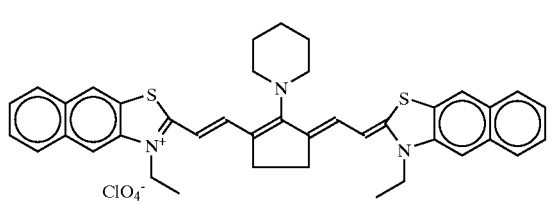
III-36
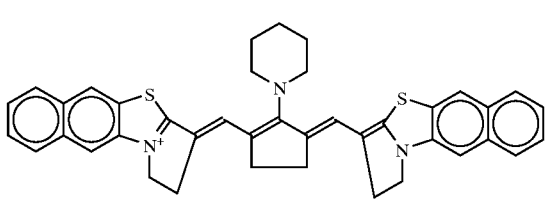

-continued
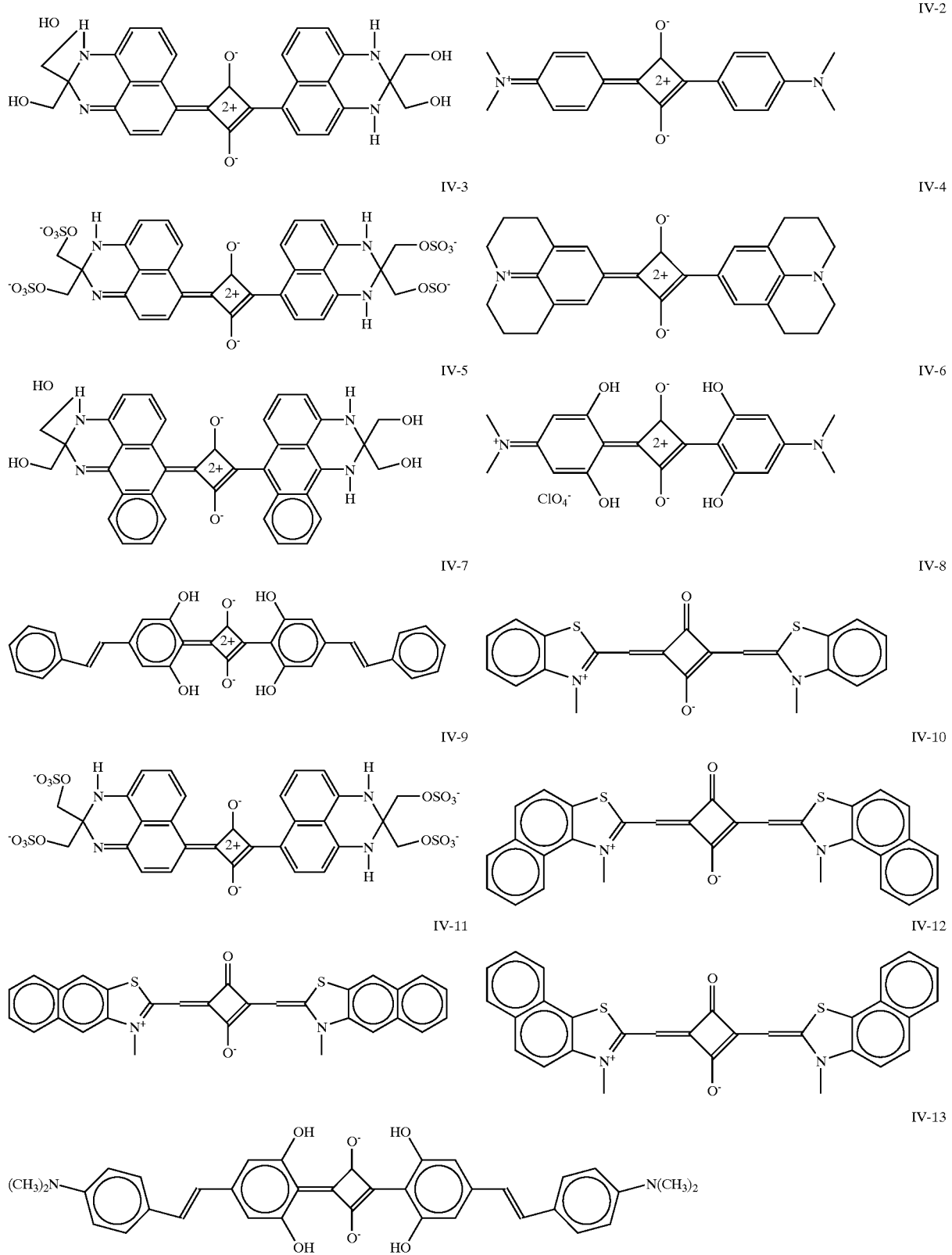

-continued
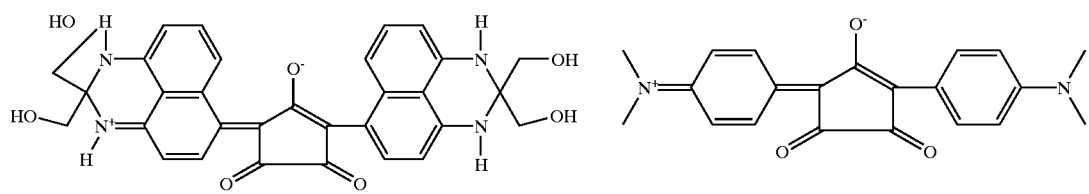
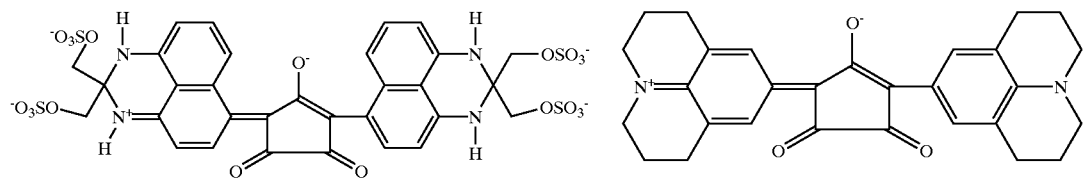
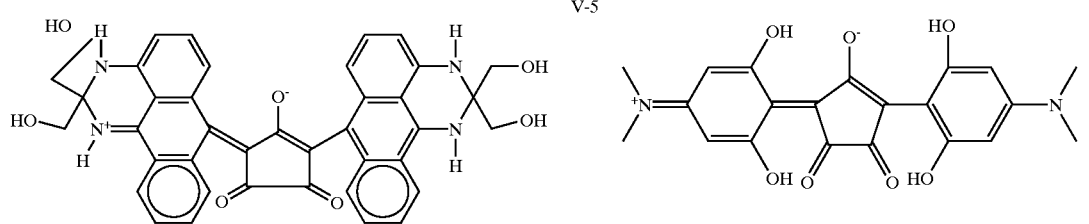
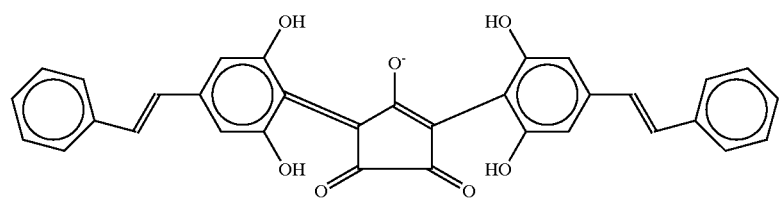
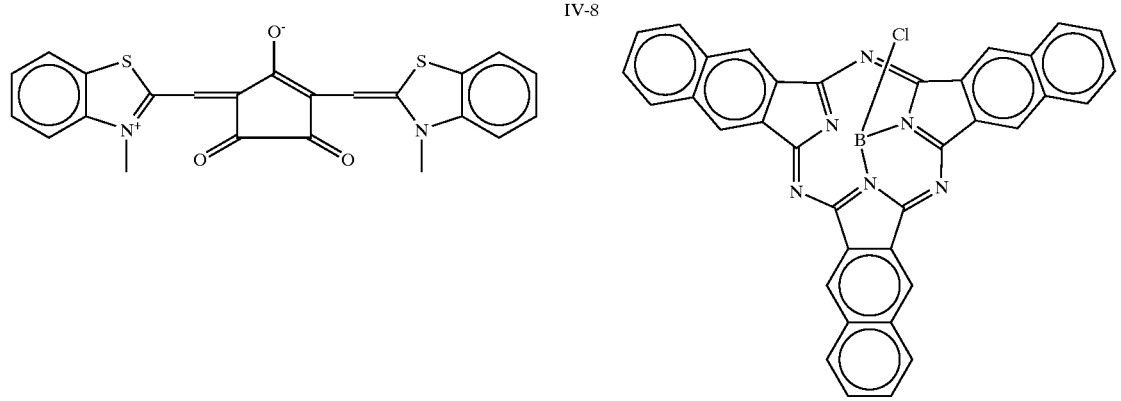

-continued
VI-2
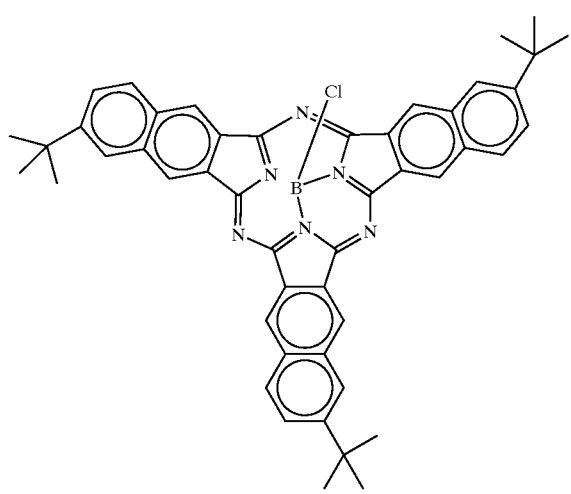
VI-3
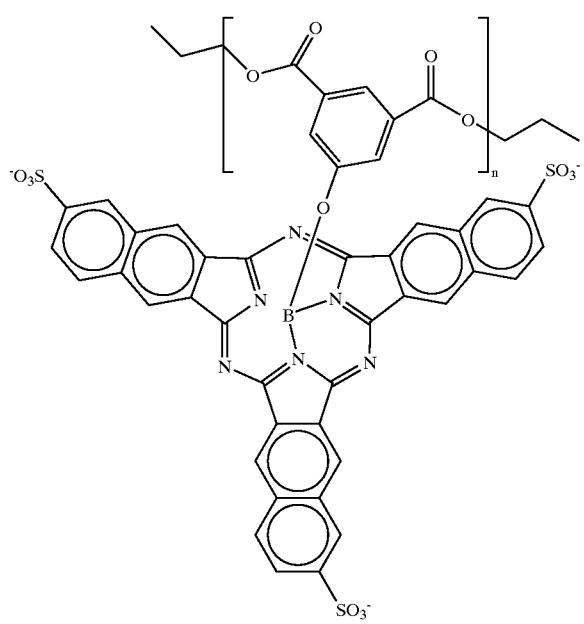
VI-4
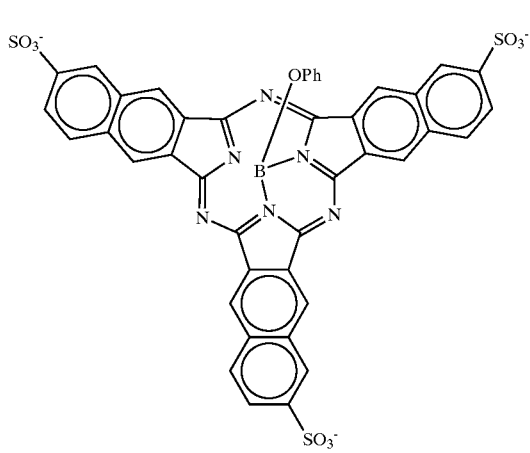
VII-1
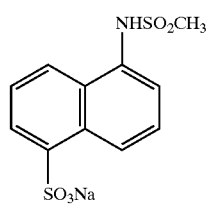
VIII-1
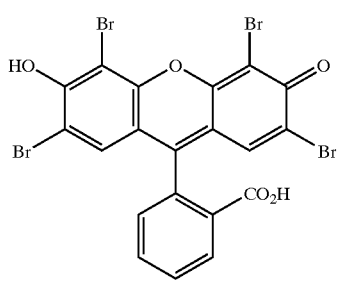
VIV-1
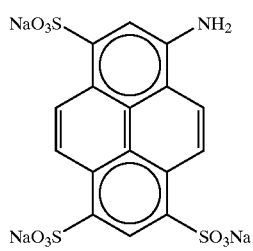
X-1
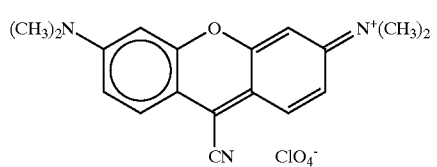
XI-1
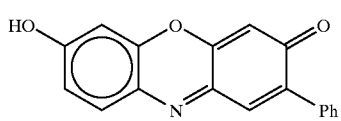

-continued
XI-2
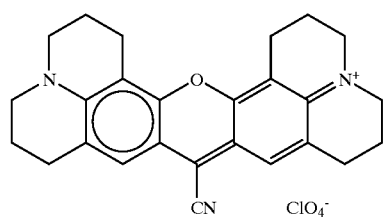
ClO4−
XI-3
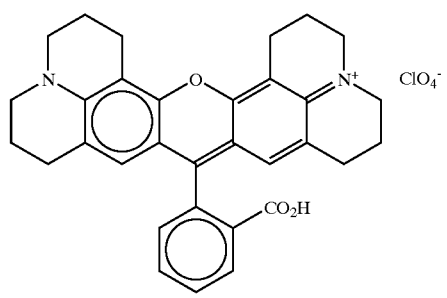
ClO4−
XII-1
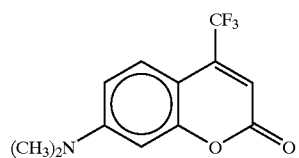
XIII-1
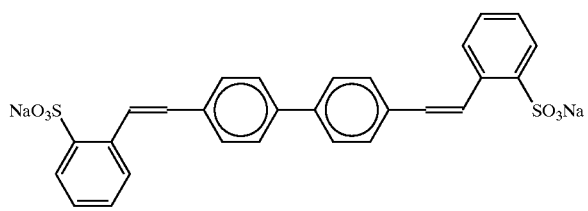
XIV-1
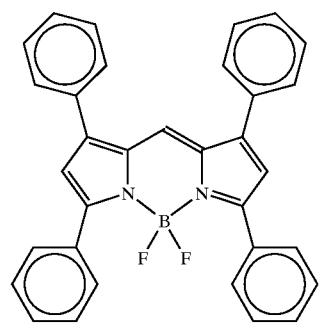
XIV-2
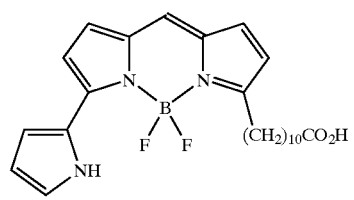
XIV-3
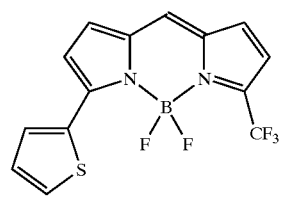
XIV-4
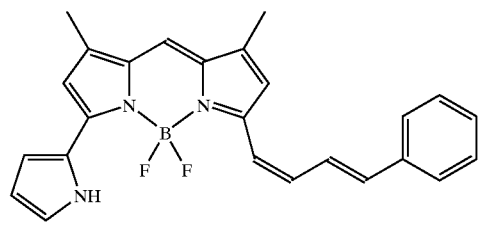
XV-1
XVI-1
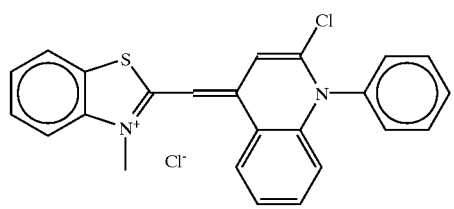
Cl−

-continued

XVII-1
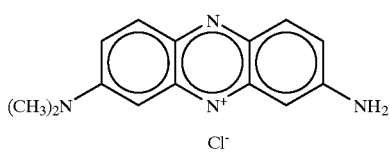

XVIII-1

XIX-1
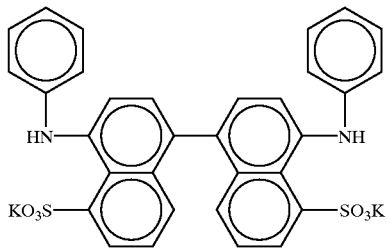

XX
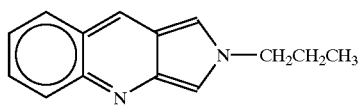

XXI
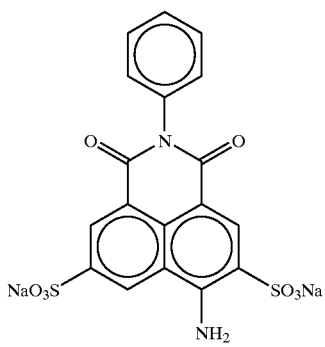

XXII

The methods of applying the invisible material on an article can be any digital imaging mechanism, such as printing, including inkjet, direct thermal or thermal transfer printing, electrophotography, molecular recognition, thermal, or light induced chemical reaction, such as oxidant, reductant or metal complexation, of leuco dyes. Other methods include commercial color imaging systems, such as Cycolor™ system available from Cycolor Inc., 8821 Washington Church Road, Miamisburgh, Ohio 45342 and microcapsules (cyliths) containing colored dyes are selectively imagewise exposed with sequential red, green and blue light. The light initiates the hardening of the shell of the exposed bead rendering them resistant to destruction during the processing step. During the processing step the beads are compressed and the non-hardened beads are crushed releasing their colored dye which is the complimentary to the exposure color (red/cyan, green/magenta, blue/yellow). A discussion on methods of applying a material to a surface can be found in "Imaging Processes and Materials", chapter 1, Neblette's, $8^{th}$ ed., Van Nostrand Reinhold, 1989.

In the following examples inkjet and thermal dye transfer methods were chosen as the methods to apply the luminescence materials digitally on various supports.

Inkjet Method

The concentration of the invisible material in the ink solution can be 0.005%~1% by weight, preferably 0.01%~0.1% by weight. A suitable surfactant such as surfynol® 465 surfactant (an ethoxylated dialcohol surfactant sold by Air Products and Chemicals, Inc.)can be added at 0.5%–2% by weight, with the presence of 2–10% glycerol, 2–10% diethyleneglycol, 2–10% propanol, and 0%–2% triethanolamine. Commercial inkjet printers such as HP690C or Epson Stylus Color 200 was used for the testing, with the printing resolution of 300 or 360 dpi. Either stepwedge files or 2-D bar-code encoding compressed sound file can be printed digitally onto various supports at the visual reflection density of 0.01–0.3, preferably 0.05–0.1.

Thermal Dye Transfer Method

An assemblage of thermal dye transfer such as described in U.S. Pat. No. 4,839,336 can be used. This assemblage comprises: (a) a dye-donor element that contains the invisible material, ((b) a dye-receiving element which is in a superposed relationship with the dye-donor element so that the dye-layer of the donor element is in contact with the dye-image receiving layer of the receiving element.

The above assemblage comprising these two elements may be pre-assembled as an integral unit when a single luminescent dye material is transferred. This can be done by temporarily adhering the two elements together at their margins. After transfer, the dye-receiving element is then peeled apart to reveal the dye transfer image.

When a luminescent image was generated on top of a three-color thermal transferred image, dye-donor elements containing cyan, yellow and magenta dyes are used similar to that disclosed in U. S. Pat. 4,839,336. The assemblage is formed first on three occasions during the time when heat is applied by the thermal printing head. After the first dye is transferred , the elements are peeled apart. A second dye-donor element is then brought in register with the dye-receiving element and the process repeated. The third color is obtained in the same manner to generated a three-color thermal transferred image. Finally, the dye-donor element containing the luminescent material was transferred on top of the said three-color image to form a 2D (that is, a two-dimensional) bar-code file that encodes the compressed information such as sound associated with the three-color image. More than one dye donor sheet containing different luminescent materials can also be used and multiple luminescent 2D bar-code images can be transferred consecutively.

The luminescent material in the dye-donor element is dispersed in a polymer binder such as a cellulose derivatives, e. g., cellulose acetate hydrogen phthalate, cellulose acetate propionate, cellulose acetate butyrate, cellulose triacetate or any of the materials described in U. S. Pat. No. 4,700,207. The binder may be used at a coverage of from about 0.1 to about 5 g/m$^2$, and the luminescent material can be used at a coverage of from about 0.02 to about 0.2 g/m$^2$. The support for dye-donor element in this invention can be any material that is dimensionally stable and can withstand the heat of the thermal printing heads. Such materials include polyesters such as poly(ethylene terephthalate); polyamides; polycarbonates; cellulose esters such as cellulose acetate; fluorine polymers such as polyvinylidene fluoride or poly (tetrafluoroethylene-co-hexafluoropropylene); polyethers such as polyoxymethylene,; polyacetals; polyolefins such as polystyrene, polyethylene, polypropylene or methylpentane polymers; and polymides such as polymide-amides and polyetherimides. The support generally has a thickness of from about 2 to 30 μm. It may also be coated with a subbing layer, if desired, such as those materials described in U. S. Pat. No. 4,695,288.

The reverse side of the dye-donor element may be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semicrystalline organic solids that melt below 100° C. such as poly(vinyl stearate), beeswax, perfluorinated alkyl ester polyethers, poly (caprolactone), silicone oil, poly(tetrafluoroethylene), carbowax, poly(ethylene glycols). Suitable polymeric binders for the slipping layer include poly(vinyl alcohol-cobutyral), poly(vinyl alcohol-co-acetal), poly(styrene), poly(vinyl acetate), cellulose acetate butyrate, cellulose acetate propionate, cellulose acetate or ethyl cellulose. The amount of the lubricating is generally in the range of about 0.001 to about 2 g/m$^2$. In the presence of a polymeric binder, the lubricating material is present in the range of 0.01 to 50 weight %, preferably 0.5 to 40, of the polymer binder employed.

The dye receiving element that is used with the dye-donor element of the invention usually comprise a support having thereon a dye imaging-receiving layer. The support may be transparent film such as a poly(ether sulfone), a polymide, a cellulose ester such as cellulose acetate, a poly(vinyl alcohol-co-acetal) or a poly(ethylene terephthalate). The support for the dye receiving element may also be reflective such as baryta-coated paper, polyethylene-coated paper, white polyester (polyester with white pigment incorporated therein), an ivory paper, a condenser paper or a synthetic paper such as duPont Tyvek®. The dye-image receiving layer may comprise, for example a polycarbonate, a polyurethane, a polyester, polyvinyl chloride, poly(styrene-co-acrylonitrile), poly(carprolactone) or mixtures thereof. The dye image receiving layer may be present in the amount of about 1 to about 5 g/m$^2$.

As noted above, one of the intention of the invention are to use dye thermal transfer method to form luminescent data over a blank support or a three-colored thermal transfer image. Such a process comprise imagewise-heating a dye-donor element as described above and transferring a luminescent dye image to a dye-receiving element to form the luminescent image. The dye-donor element of the invention may used in sheet form or in a continuous roll or ribbon which may contain only the luminescent material or may have alternating areas of other image dyes such as sublimable cyan and/or magenta and/or yellow and the luminescent material. Such image dyes are disclosed in U. S. Pat. Nos. 4,541,830; 4,698,651; 4,695,287; 4,701,439, the disclosures of which are hereby incorporated by references. Thus, luminescent image (at least one) over one- two-, three- or higher number color elements are included in this invention.

Thermal printing heads which can be used to transfer dye from the dye-donor elements for the invention are available commercially. There can be employed, for example, a Fujitsu Thermal Head (FTP-040 MCSOO1), a TDK thermal head F415 HH7-1089 or a Rohm Thermal Head KE 2008-F3.

The playback device is preferably a hand held wand reader or a digital camera with engineered to operate in a dual role as a playback device. The sensor of this device could have integrated CCD or CMOS technology with a LED illumination source, decoding software and chips. One example of such a device would also have the mechanism to playback the file as an analog sound file. Descriptions of such devices can be found in commonly assigned copending application Ser. Nos. 08/931,575, 09/099627, 08/959,041, 08/959,036 and 09/099,616, the entire disclosures of which are incorporated herein by reference.

The following examples are provided to illustrate this invention. The structures of dyes used in the examples are shown below:

Dye 1 polymeric aluminum phthalocyanine dye (commercially available from Eastman Chemical as NIRF ink solution).

Dye 2
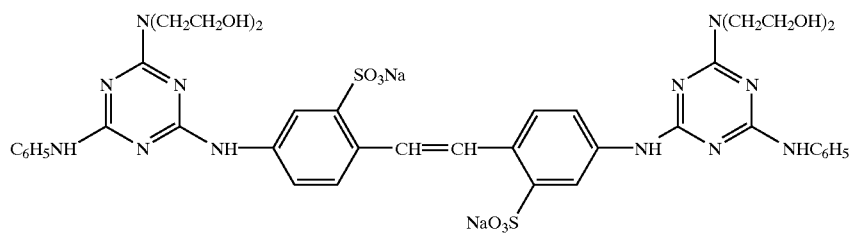
Dye 3
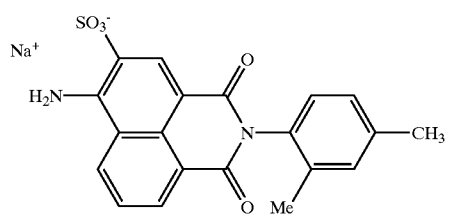
Dye 4
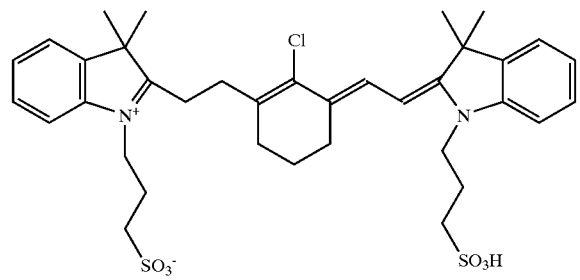
Dye 5
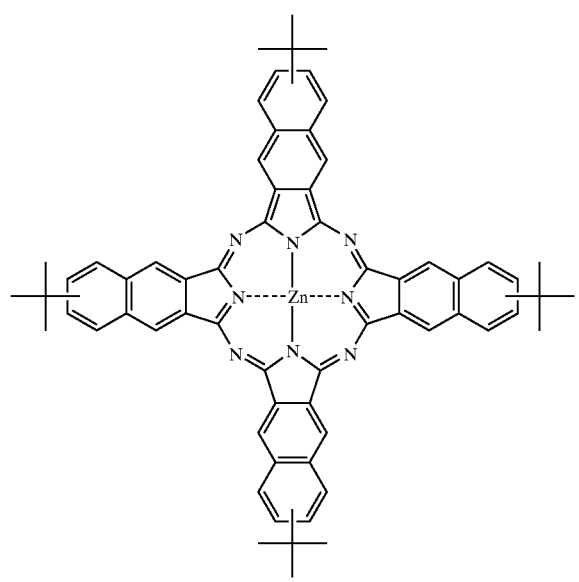
Dye 6
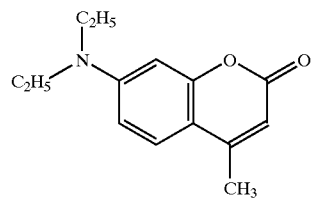
Dye 7
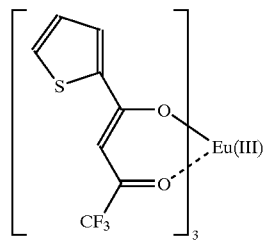

-continued

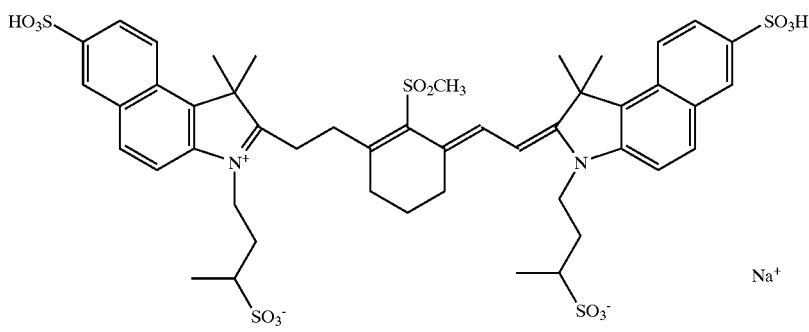
Dye 8

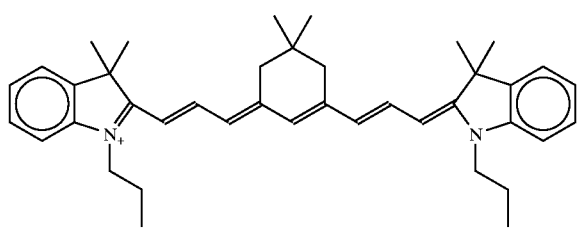
Dye 9

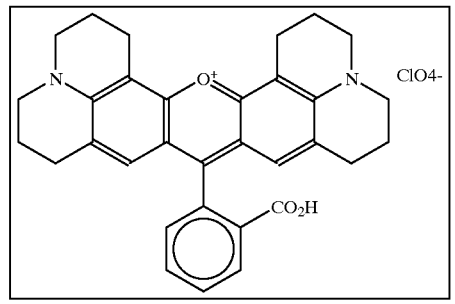
Dye 10

EXAMPLE 1

A) 1.5 g of stock solution of ink containing a near-IR dye (dye 1, 0.06% by weight,) commercially available from Eastman Chemical Company as a NIRF™ ink (PM19599) was diluted with 13.5 g of solution containing surfynol® 465 (from Air Product), glycerol, diethyleneglycol, propanol and distilled water so that the final concentration of dye 1 is 0.006% by weight and 1% surfynol 465, 5% glycerol, 4% diethyleneglycol and 5% propanol. The resulted ink solution was filled into a refillable inkjet cartridge. A step image and a 2D bar-code image which represents a compressed sound file encoding 6 seconds of sound information were printed on glossy photographic quality inkjet papers with a HP 690C inkjet printer at 300 dpi resolution.

The step image was used to evaluate the dye spectroscopic characteristics such as reflection and fluorescence properties. The reflection spectra were obtained with the HP Lambda 19 UV/Vis/NIR spectrometer with an integrating sphere using an aperture mask to allow only the coated area of the paper be measured. The fluorescence spectra was obtained with a SPEX Fluo-2 fluorometer equipped with an IR detector at room temperature. The results are shown in Table 1.

B) An element similar to A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to A) was prepared except that the fluorescent image was printed on an inkjet transparency film instead of the glossy inkjet paper. The luminescent image printed was invisible to human eye under normal viewing conditions.

EXAMPLE 2

Reading the 2-D luminescent bar-code:

The 2-D luminescent bar-code generated in Element 1(A) was use as an example to demonstrate the principle of detecting the luminescent 2D-barcode that encode 6 second of sound information and playing back the original sound. A 635 nm red LED was used to irradiate the sample and a CCD camera was used to capture the fluorescent image. Using a commercial software (XXX), the compressed sound file was decompressed, translated and played back as a 6 second sound.

EXAMPLE 3

A) An element similar to element 1 (A) was prepared except that the fluorescent dye is a UV-absorbing, visible fluorescing dye (dye 2), and that the final concentration of dye 2 is 0.1% by weight in the ink solution.

B) An element similar to 3(A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to 3(A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to 3(A) was prepared except that the fluorescent image was printed on an inkjet transparency film instead of the glossy inkjet paper. The luminescent image printed was invisible to human eye under normal viewing conditions.

EXAMPLE 4

A) An element similar to element 1 (A) was prepared except that the fluorescent dye is a visible-absorbing, visible fluorescing dye (dye 3), and that the final concentration of dye 3 is 0.01% by weight in the ink solution.

B) An element similar to 4(A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to 4(A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to 4(A) was prepared except that the fluorescent image was printed on an inkjet transparency film instead of the glossy inkjet paper. The luminescent image printed was invisible to human eye under normal viewing conditions.

EXAMPLE 5

A) An element similar to element 1 (A) was prepared except that the fluorescent dye is a infrared-absorbing, infrared fluorescing dye (dye 4, a cyanine dye), and that the final concentration of dye 4 is 0.01% by weight in the ink solution.

B) An element similar to 5(A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to 5(A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to 5(A) was prepared except that the fluorescent image was printed on an inkjet transparency film instead of the glossy inkjet paper. The luminescent image printed was invisible to human eye under normal viewing conditions.

EXAMPLE 6

A) An element similar to element 1 (A) was prepared except that two fluorescent inks (one contains an UV-absorbing, visible fluorescent dye, dye 2, the other contains an infrared absorbing, infrared fluorescent dye, dye 4) and that the final concentration of dye 2 and dye 4 are 0.1% and 0.01% by weight in the ink solutions, respectively. Two different luminescent 2D bar-codes (partially or completely overlap with each other) representing different compressed sound information were generated consecutively on a blank inkjet paper. The luminescent images printed were invisible to human eye under normal viewing conditions. The results are shown in Table 1.

B) An element similar to 6(A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to 6(A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to 6(A) was prepared except that the fluorescent image was printed on an inkjet transparency film instead of the glossy inkjet paper. The luminescent image printed was invisible to human eye under normal viewing conditions.

EXAMPLE 7

A) An element similar to element 1(A) was prepared except that two fluorescent inks (one contains a near infrared-absorbing, near infrared fluorescent dye, dye 1, the other contains an infrared absorbing, infrared fluorescent dye, dye 4) and that the final concentration of dye 1 and dye 4 are 0.006% and 0.01% by weight, respectively, in the ink solutions. Two different luminescent 2D bar-codes (partially or completely overlap with each other) representing different compressed sound information were generated consecutively on a blank inkjet paper. The luminescent images printed were invisible to human eye under normal viewing conditions. The results are shown in Table 1.

B) An element similar to 7(A) was prepared except that the fluorescent image was printed over inkjet printed three color image on a glossy inkjet paper instead of the blank glossy inkjet paper. The luminescent image printed was invisible to human eye under normal viewing conditions and didn't effect the quality of the color image.

C) An element similar to 7(A) was prepared except that the fluorescent image was printed on a conventional photographic papers containing photographic images instead of the glossy inkjet paper. The luminescent image printed was invisible to human eye under normal viewing conditions and didn't effect the quality of the color image.

D). An element similar to 7(A) was prepared except that the fluorescent image was printed on an inkjet transparency film instead of the glossy inkjet paper. The luminescent image printed was invisible to human eye under normal viewing conditions.

EXAMPLE 8

(A) A luminescence dye-donor element was prepared by coating the following layers in the order recited on a 6 $\mu$m poly(ethylene terephthalate) support:

(1) Subbing layer of duPont Tyzor TBT® titanium tetra-n-butoxide (0.16 g/m$^2$) coated from a n-butyl alcohol and n-propylacetate solvent mixture, and (2) Dye layer containing the luminescent dye (dye 5, a zinc naphthalocyanine derivative) shown in Table 1 (0.054 g/m$^2$), in a cellulose acetate propionate (2.5% acetyl, 48% propionyl) binder (0.14 g/m$^2$) coated from a 2-butanone and propyl acetate (80/20 ratio by weight) solvent mixture.

(3) A slip layer was coated on the back side of the element similar to that disclosed in U. S. Pat. (Henzel et a;, Jun. 16, 1987)

A dye receiving element was similar to that disclosed in U. S. Pat. No. 4,839,336. A solution of Makrolon 5705® (Bayer AG Corporation) polycarbonate resin (2.9 g/m$^2$) in methylene chloride on a pigmented polyethlyene-overcoated paper stock to obtain the thermal receiver paper.

The dye side of the luminescent dye-donor element strip approximately 10 cm×13 cm in area was placed in contact with the image receiver layer of the dye receiver element of the same area. The assemblage was clamped to a stepper-motor driven 60 mm diameter rubber roller and a TDK Thermal Head (No. L-231) (thermostatted at 26° C.) was pressed with a force of 3.6 kg against the luminescent-donor element side of the assemblage pushing it against the rubber roller.

The imaging electronics were activated causing the donor/receiver assemblage to be drawn through the printing head/roller nip at 40.3 mm/sec. Coincidentally, resistive element in the thermal print head were pulsed for 127.75 ms/pulse at 130.75 ms intervals during a 4.575 ms/dot printing cycle (including a 0.391 ms/dot cool down interval). A stepped density image was generated by incrementally increasing the number of pulses/dot from 0 to 255. The voltage supplied too the thermal head was approximately 14.0 v resulting in an instantaneous peak power of 0.369 watts/dot and a maximum total energy of 1.51 mJ/dot. Similarly, a two dimensional luminescent bar-code representing a compressed sound file can also be generated digitally using this thermal dye transfer method. The luminescent image transferred was invisible to human eye under normal viewing conditions.

The step image was used to evaluate the dye spectroscopic characteristics such as reflection and fluorescence properties. The reflection spectra were obtained with the HP Lambda 19 UV/Vis/NIR spectrometer with an integrating sphere using an aperture mask to allow only the coated area of the paper be measured. The fluorescence spectra was obtained with a SPEX Fluo-2 fluorometer equipped with a . . . IR detector at room temperature. The results are shown in Table 1.

B) An element similar to 8(A) was prepared except that the thermal receiving element contains thermally transferred three color dye image. The luminescent image was transferred on top of the said three color image. The luminescent image transferred was invisible to human eye under normal viewing conditions and didn't effect the quality of the said three color image.

EXAMPLE 9

A) An element similar to 8(A) was prepared except that the luminescent dye is a UV absorbing, visible fluorescing dye (dye 6, a coumarin dye). The luminescent image transferred was invisible to human eye under normal viewing conditions.

B) An element similar to 9(A) was prepared except that the thermal receiving element contains thermally transferred three color dye image. The method of preparing thermally transferred three color image was similar to disclose in U. S. Pat. No. 4,839,336. The luminescent image was transferred on top of the said three color image. The luminescent image transferred was invisible to human eye under normal viewing conditions and didn't effect the quality of the said three color image.

EXAMPLE 10

A) An element similar to 8(A) was prepared except that the luminescent dye is a UV absorbing, visible fluorescing dye (dye 7, an europium complex). The luminescent image transferred was invisible to human eye under normal viewing conditions.

B) An element similar to 10(A) was prepared except that the thermal receiving element contains thermally transferred three color dye image. The method of preparing thermally transferred three color image was similar to disclose in U. S. Pat. No. 4,839,336. The luminescent image was transferred on top of the said three color image. The luminescent image transferred was invisible to human eye under normal viewing conditions and didn't effect the quality of the said three color image.

EXAMPLE 11

A) An element similar to element 8(A) was prepared except that two fluorescent dye-donor sheets (one contains an UV-absorbing, visible fluorescent dye, dye 6, the other contains an infrared absorbing, infrared fluorescent dye, dye 5) both coated at 0.054 g/m$^2$ in the luminescent dye-donor layer. Two different luminescent 2D bar-codes (partially or completely overlap with each other) representing different compressed sound information were thermally transferred consecutively on a blank thermal receiver element. The luminescent images printed were invisible to human eye under normal viewing conditions. The results are shown in Table 1.

B) An element similar to 11(A) was prepared except that the thermal receiving element contains thermally transferred three color dye image. The method of preparing thermally transferred three color image was similar to disclose in U. S. Pat. No. 4,839,336. The luminescent images w transferred on top of the said three color image. Two different luminescent 2D bar-codes (partially or completely overlap with each other) representing different compressed sound information were thermally transferred consecutively on a blank thermal receiver element. luminescent images transferred were invisible to human eye under normal viewing conditions and didn't effect the quality of the said three color image.

EXAMPLE 12

A) An element similar to element 1(A) was prepared except that the fluorescent dye is an infrared-absorbing, nonfluorescing dye (dye 8), and that the final concentration of dye 8 is 200 ppm by weight in the ink solution. The image printed was nearly invisible to human eye under normal viewing conditions.

B) An element similar to 12(A) was prepared except that the fluorescent image was printed over inkjet printed three color image on a glossy inkjet paper instead of the blank glossy inkjet paper. The image printed was clearly invisible to human eye under normal viewing conditions and did not effect the quality of the color image.

C) An element similar to 12(A) was prepared except that the image was printed on a conventional photographic paper containing a full color photographic image instead of the glossy inkjet paper. The image printed was clearly invisible to human eye under normal viewing conditions and did not effect the quality of the color image.

D) The invisible data file printed on the surface of the photographic article in 12(c) was read by a sensor and the sound file played back.

TABLE 1

| Example No. | Dye No. | Absorption $\lambda_{max}$ (nm) | fluorescence $\lambda_F$ (nm) | Applying Method |
|---|---|---|---|---|
| 1 | 1 | 680 | 686 | inkjet |
| 3 | 2 | 349 | 433 | inkjet |
| 4 | 3 | 430 | 495 | InkJet |
| 5 | 4 | 801 | 835 | inkjet |
| 6 | 2 and | 349 | 433 | inkjet |
|   | 4 | 801 | 835 |   |
| 7 | 1 and | 680 | 686 | inkjet |
|   | 4 | 801 | 835 |   |
| 8 | 5 | 775 | 850 | thermal transfer |
| 9 | 6 | 365 | 437 | thermal transfer |
| 10 | 7 | 342 | 613 | thermal transfer |
| 11 | 5 and | 775 | 850 | thermal transfer |
|   | 6 | 365 | 437 |   |
| 12 | 8 | 890 | N/A | InkJet |

Notes:
1) The substrates for the luminescent bar-codes using the inkjet methods can be coated blank inkjet paper, coated inkjet paper containing inkjet printed color images, conventional photographic prints containing color images, inkjet transparencies, or any other prints, etc.
2) The substrates for the luminescent bar-codes using the thermal transfer methods can be blank thermal transfer receiver paper or transparencies, or thermal transfer receiver paper containing thermally transferred color images, etc.

EXAMPLE 13

This example illustrates the advantageous effect of this invention. An article with conditions described in Table 2 was prepared to illustrate the effect of certain image colorants on the intensity of emitted light from a material printed on the surface above such image colorant. To practice this invention an material need be invisible and readable by a sensor on the surface of an article containing another image. To achieve this the material must emit light of nearly the same intensity despite the color of the underlying image. The ratio of the intensity on a colored patch verses a white patch was measured. The smaller in magnitude of this ratio the larger the deleterious effect of said color. That is, the lower the probability of being able to view a material on a article containing an image with this color. Comparatives 1–3 which show materials which absorb and emit in the visible region. It is clear that the colorant has a large effect on the intensity of the material emission. Comparison 4 is an example of where the surface material emits beyond 800 nm but even at this wavelength the intensity of the light is two low to be detected on a cyan image. Comparatives 5 and 6 show examples of materials which emit or absorb at 880 nm and we have found that the intensity is now sufficient to be readable even on a cyan image patch. More specifically the material, described in example 12 was applied to a surface in the form of a two dimensional pattern. Upon illumination with an appropriate light source the differential light pattern created was read. It should be noted that the data shown here is for illustrative purposes only and that the intensity magnitudes shown here will vary depending on the color of the underlying image and that the intensity of the comparison materials could have sufficient magnitudes if they are applied on images excepting some colors. It is therefore possible that under some conditions the comparison dyes shown here would be useful. Under those conditions those materials would be covered in the scope of this invention.

TABLE 2

| Sample # | Material[a] | $\lambda$max (nm)[b] | $\lambda$f (nm) | Conditions | I(color patch)/ I(white)[c,d] |
|---|---|---|---|---|---|
| 1 | Dye 2 (comparison) | 360 | 436 | inkjet paper with HP white or yellow patch | 0.000087 |
| 2 | Dye 10 (comparison) | 580 | 590.5 | inkjet paper with a white or cyan patch | 0.00044 |
| 3 | Dye 1 (comparison) | 680 | 685 | inkjet paper with a white or cyan patch | 0.013 |
| 4 | Dye 4 (comparison) | 800 | 835 | conventional color paper with a white or cyan patch | 0.12 |
| 5 | Dye 9 (inventive) | 880 | 916 | inkjet paper with a white or cyan patch | 0.55 |
| 6 | Dye 8 (inventive) | 880 | — | inkjet full color (CYK) print | 1.0 |

[a]material refers to the material which would be applied on the surface of an article and carries readable information,
[b]This is the absorbance maximum of the material on the reflection media described in the conditions.
[c]The intensity is a measure of the light which is emitted from the material in column 2 and represents the signal that would be available for reading by a sensor device after illumination. The smaller the value of the ratio the larger the negative effect having an underlying layer with an image of same color as this patch.

TABLE 2-continued

| Sample # | Material[a] | λmax (nm)[b] | λf (nm) | Conditions | I(color patch)/I(white)[c,d] |
|---|---|---|---|---|---|

[d]It should be noted that the data shown here is for illustrative purposes only and that the intensity magnitudes shown here will vary depending on the color of the underlying image and that the intensity of the comparison materials could have sufficient magnitudes if they are applied on images excepting some colors. It is therefore possible that under some conditions the comparison dyes shown here would be useful. Under those conditions those materials would be covered in the scope of this invention.

The invention has been described in detail with particular reference to certain preferred embodiments thereof, but it will be understood that variations and modifications can be effected within the spirit and scope of the invention.

What is claimed is:

1. An article comprising a layer containing an image visible to the human eye under normal viewing conditions, the image containing layer having a surface on which is applied data comprising greater than 500 pixels per square inch formed by an IR dye that forms a sensor readable differential light pattern when illuminated, said dye being substantially invisible to the human eye under normal viewing conditions;

wherein the light absorbance of at least a portion of the surface of the layer comprising said image and underlying said data is different from the light absorbance of the dye comprising the data under the conditions in which the data is read.

2. An article of claim 1, wherein the data comprises about 500 to about 5,000 pixels per square inch.

3. An article of claim 2, wherein the data is digitally encoded.

4. An article of claim 2, wherein the data is sound.

5. An article of claim 1, wherein the article is non-transparent.

6. An article of claim 1, wherein the dye is luminescent.

7. An article of claim 1, wherein the dye is substantially non-absorbing in the visible spectrum.

8. An article of claim 1, wherein the dye is a phthalocyanine, a naphthalocyanine, a sub-phthalocyanine, a cyanine, a squaraine, a croconium, or a metallized dye.

9. An article of claim 1, wherein the dye is oligomeric, dendreitic or polymeric.

10. An article of claim 1, wherein the dye is a leuco dye.

11. An article of claim 10, wherein the leuco dye is developed by light, by heat, by an oxidant, by a reductant, by metal complexation, or by molecular recognition.

12. An article of claim 1, wherein the dye is a pigment.

13. An article of claim 1, wherein the article is a thermal dye receiver, an ink jet receiver, a photographic reflection print, a wall or a window.

14. An article of claim 1 wherein the data comprises greater than 1000 pixels per square inch.

15. An article of claim 1 wherein the IR dye absorbs light between 800 nm and 1200 nm.

16. An article of claim 1 wherein the IR dye absorbs light above 850 nm.

* * * * *